Figure 7:
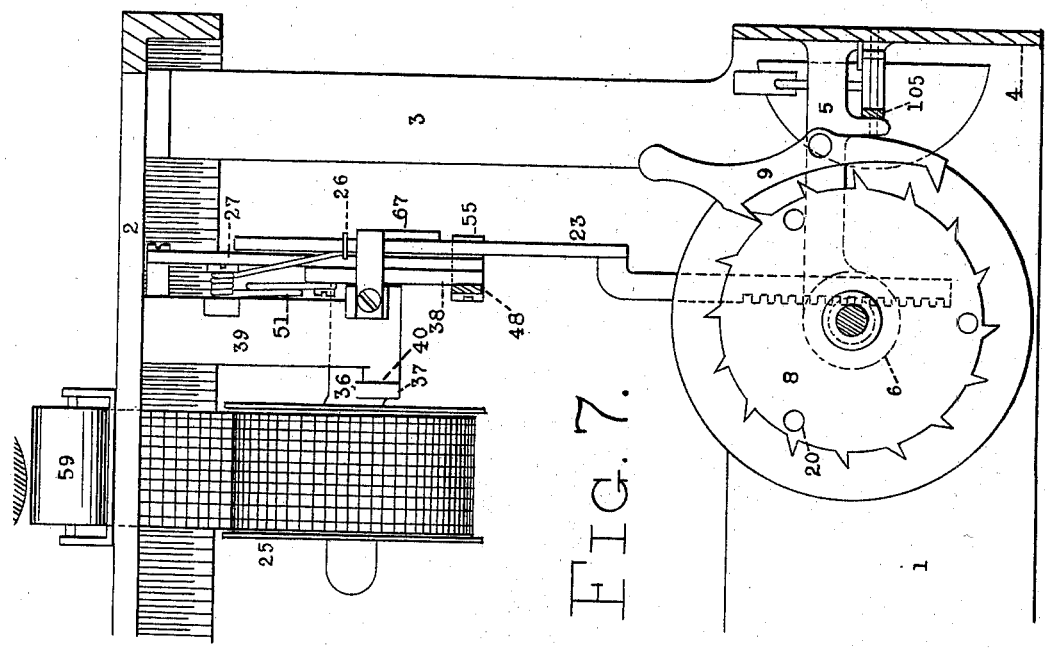

No. 609,476. Patented Aug. 23, 1898.
B. C. STICKNEY.
TYPE WRITING MACHINE.
(Application filed July 30, 1896.)
(No Model.) 9 Sheets—Sheet 1.
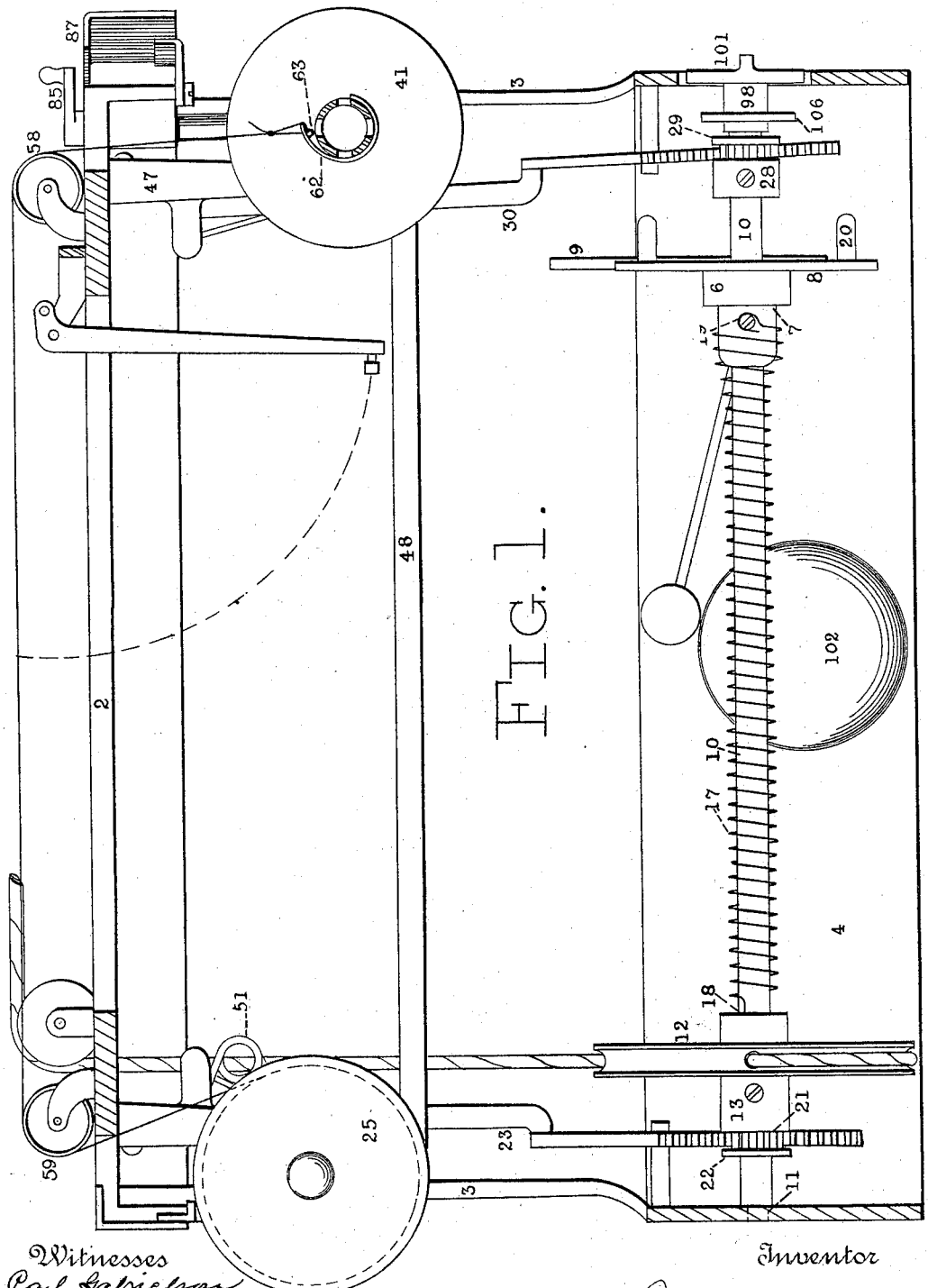
Witnesses
Paul Gabrielson
Knut Scholm
Inventor
Burnham C. Stickney

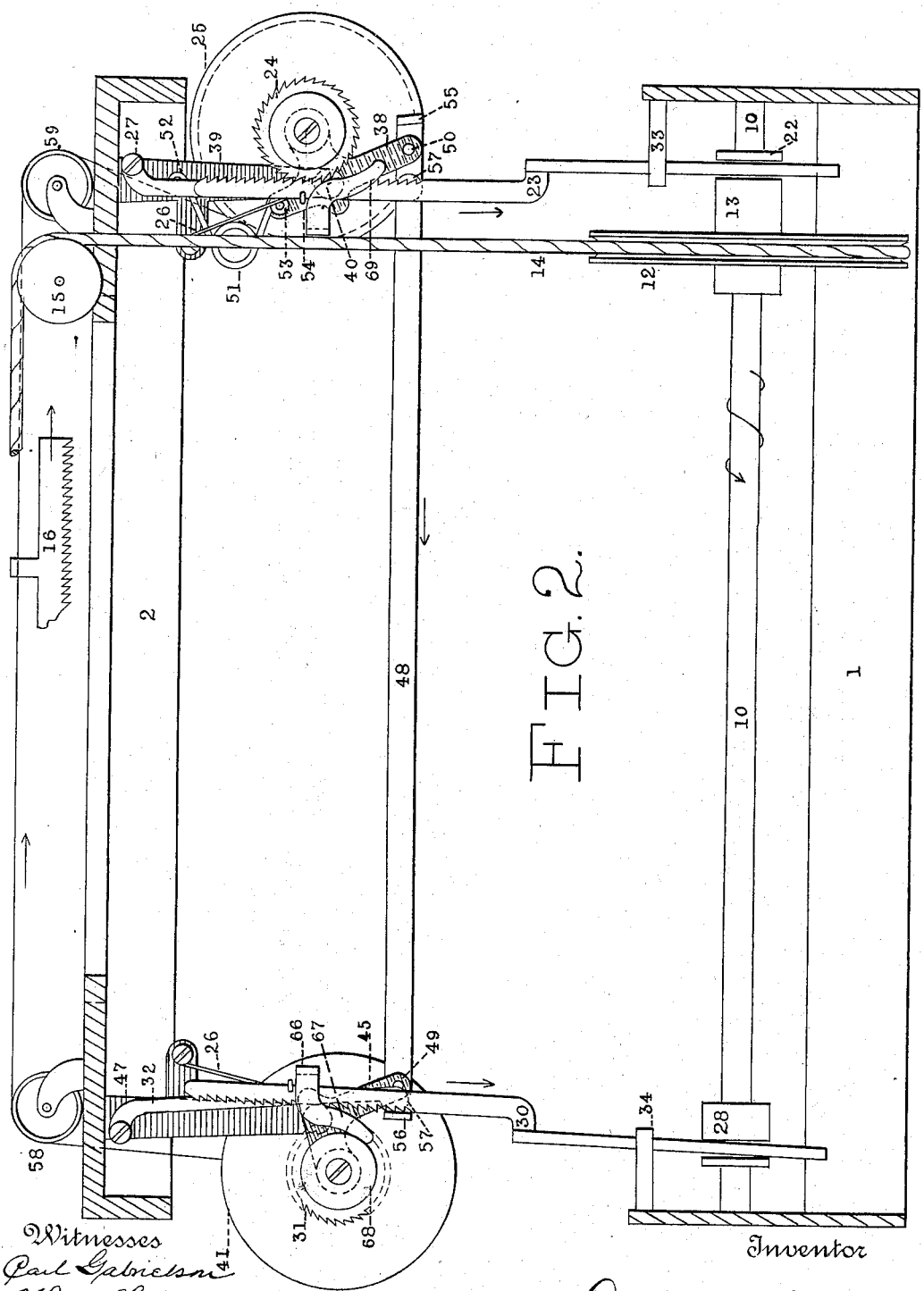

No. 609,476. Patented Aug. 23, 1898.
B. C. STICKNEY.
TYPE WRITING MACHINE.
(Application filed July 30, 1896.)
(No Model.) 9 Sheets—Sheet 3.
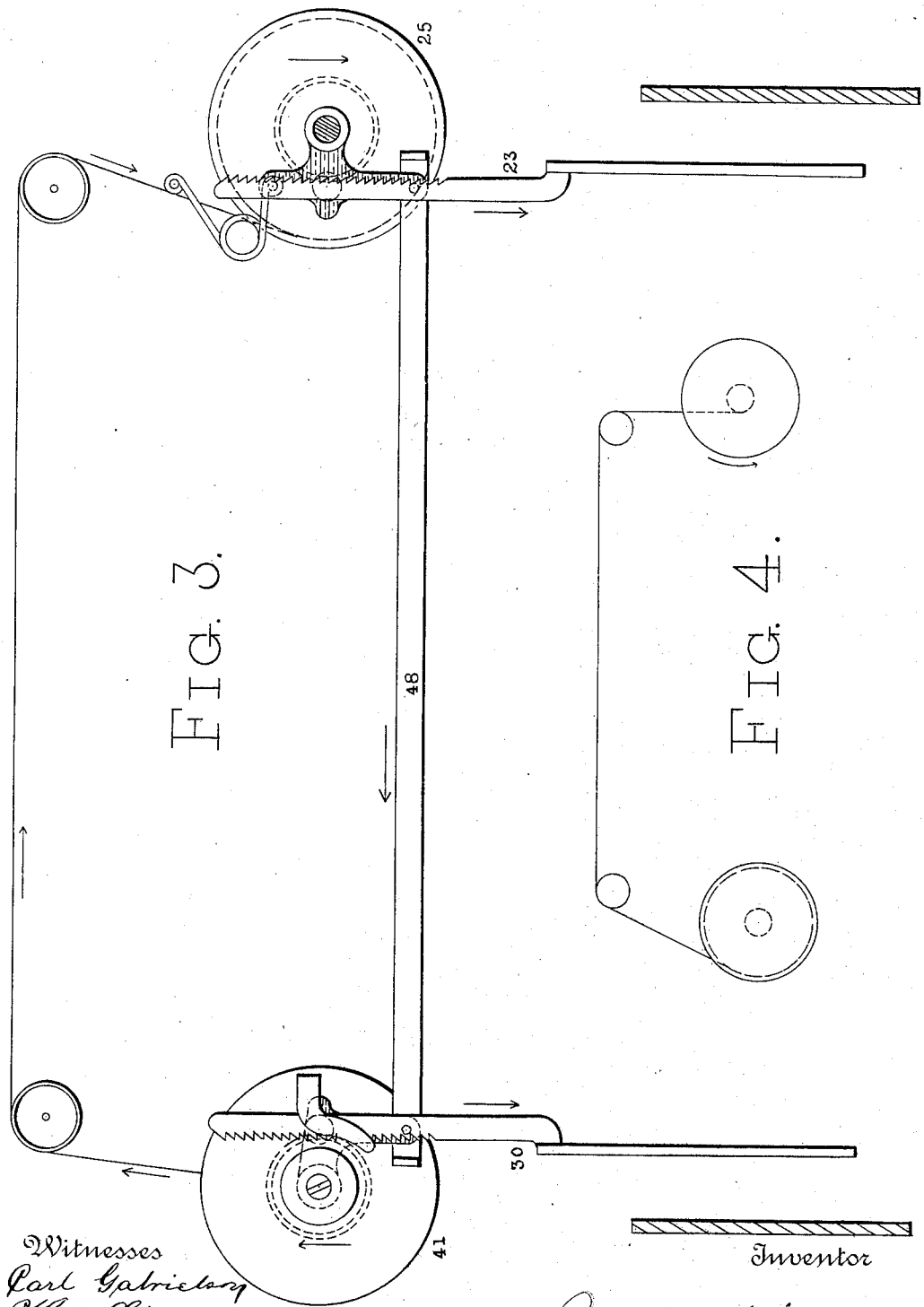

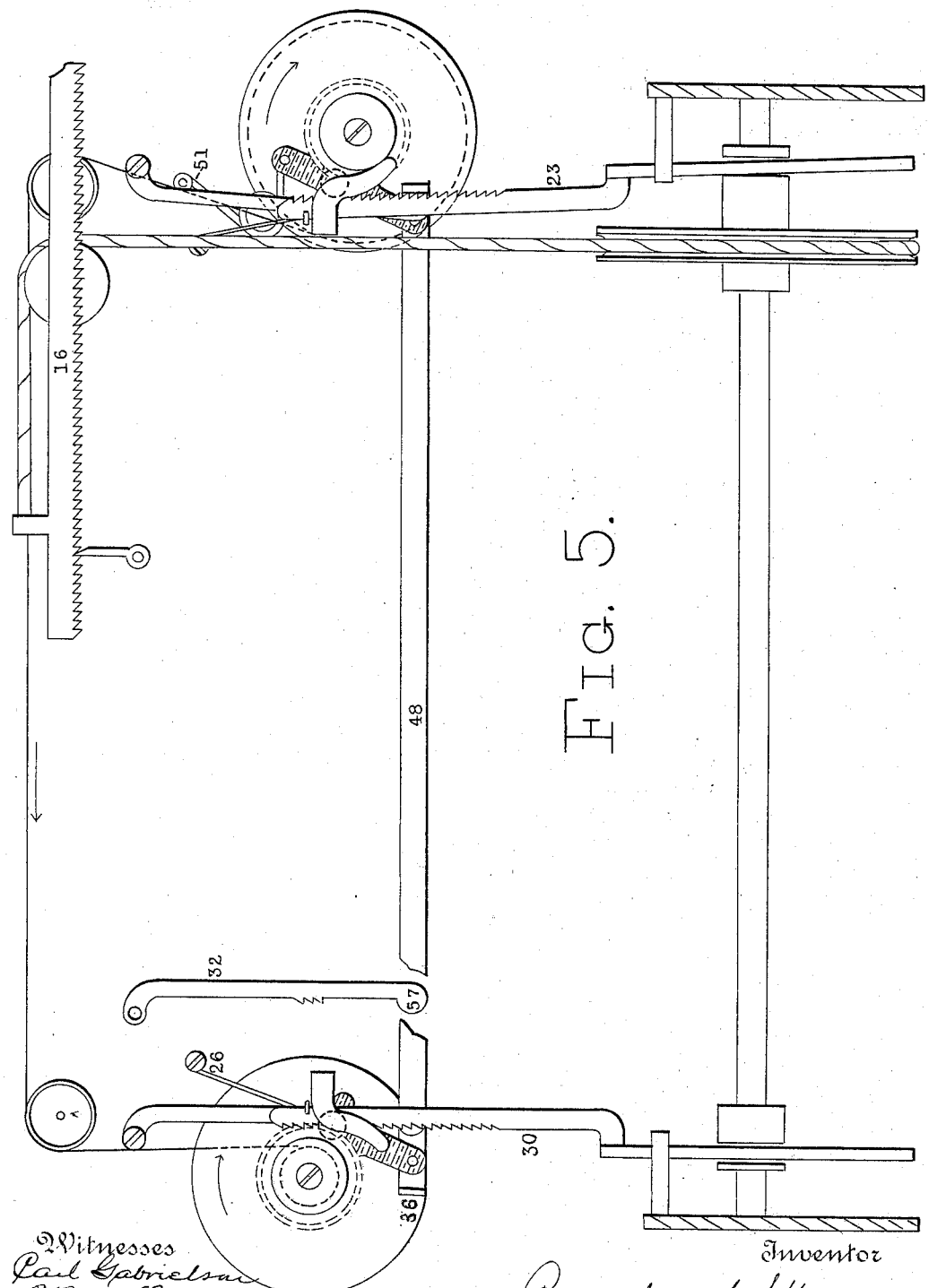

No. 609,476. Patented Aug. 23, 1898.
B. C. STICKNEY.
TYPE WRITING MACHINE.
(Application filed July 30, 1896.)
(No Model.) 9 Sheets—Sheet 5.

Witnesses
Carl Gabrielson
Knut Scholin

Inventor
Burnham C. Stickney

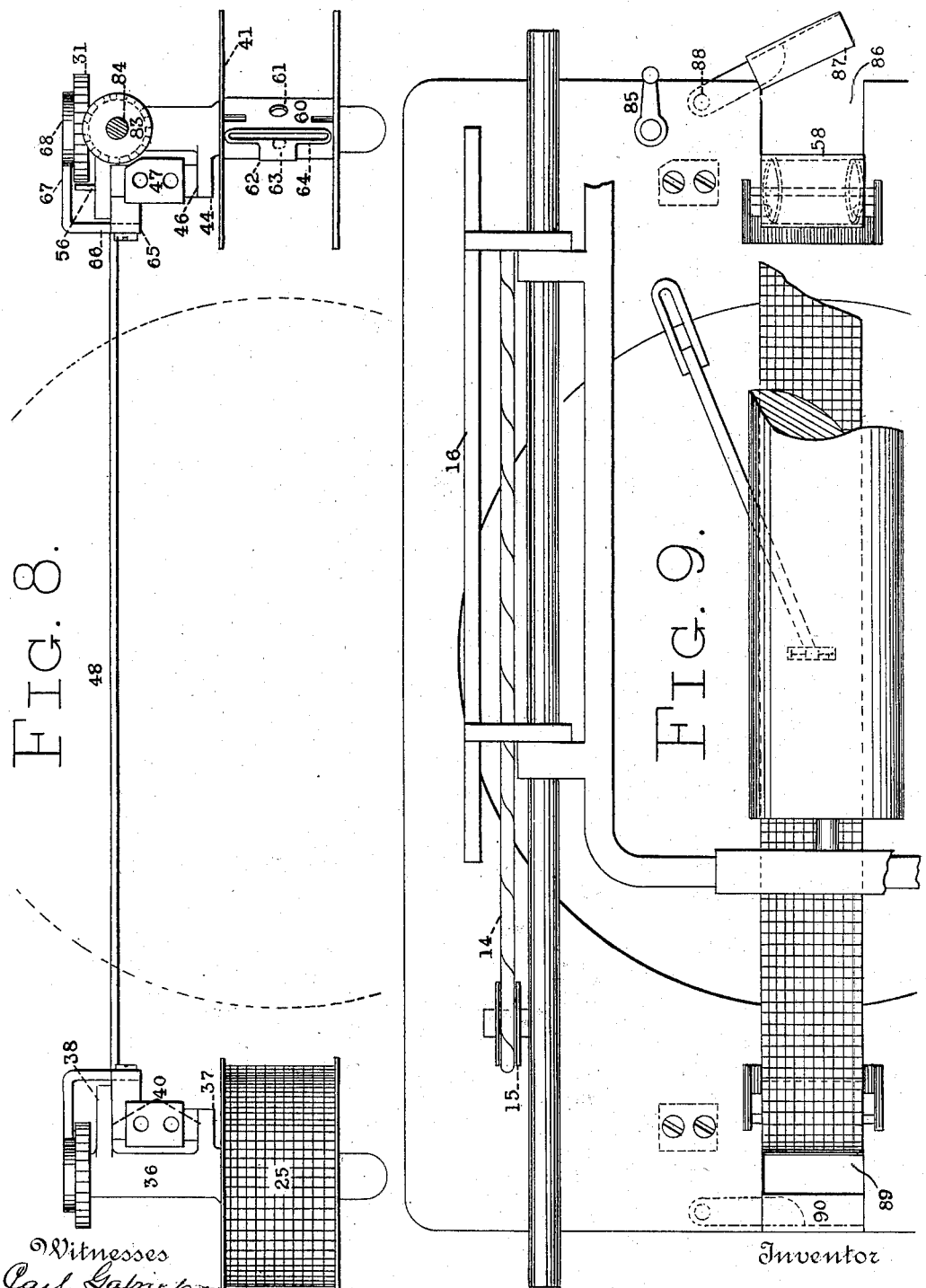

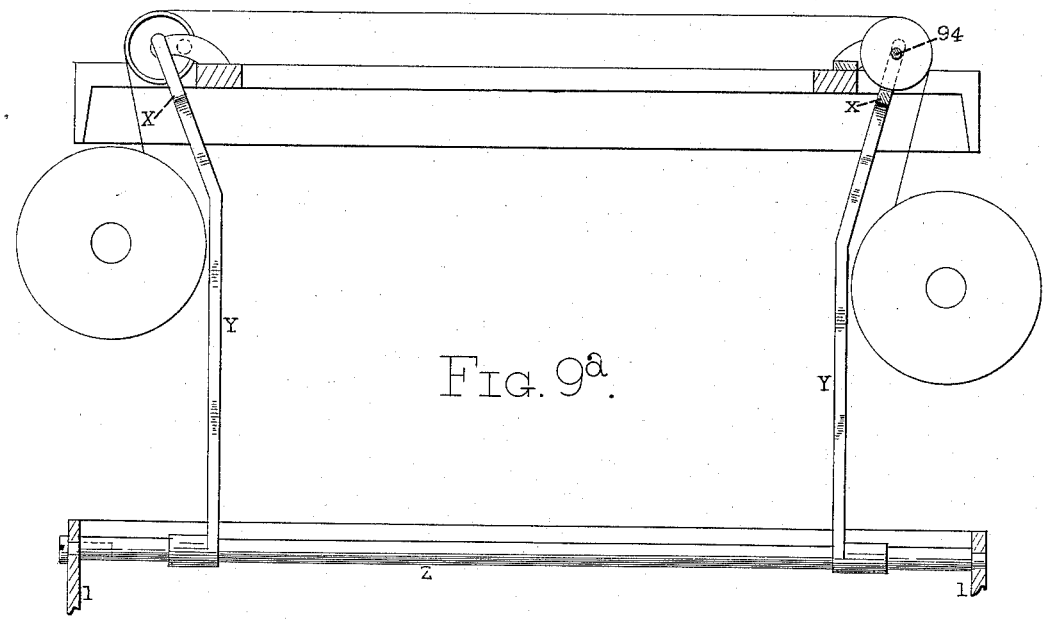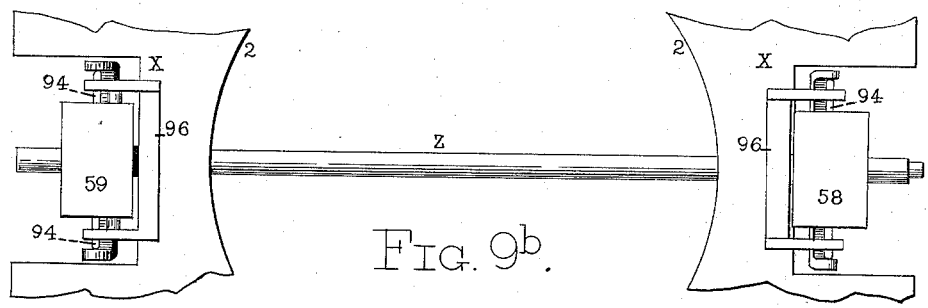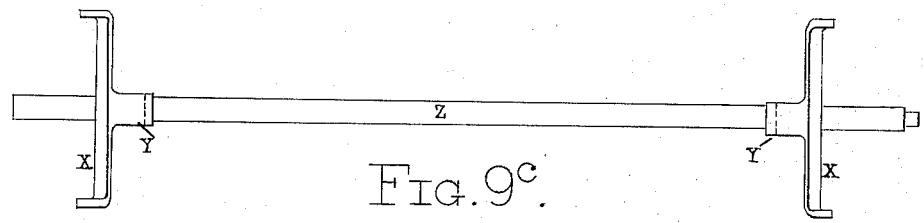

No. 609,476. Patented Aug. 23, 1898.
B. C. STICKNEY.
TYPE WRITING MACHINE.
(Application filed July 30, 1896.)

(No Model.) 9 Sheets—Sheet 8.

Witnesses
Carl Gabrielson
Knut Scholm

Inventor
Burnham C Stickney

No. 609,476.
B. C. STICKNEY.
TYPE WRITING MACHINE.
(Application filed July 30, 1896.)
Patented Aug. 23, 1898.
(No Model.)
9 Sheets—Sheet 9.
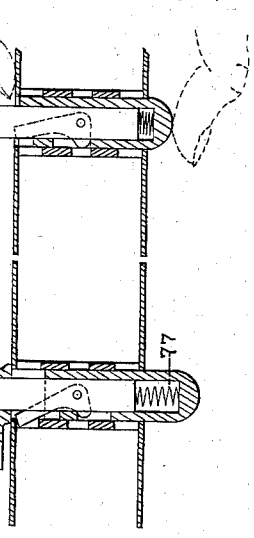
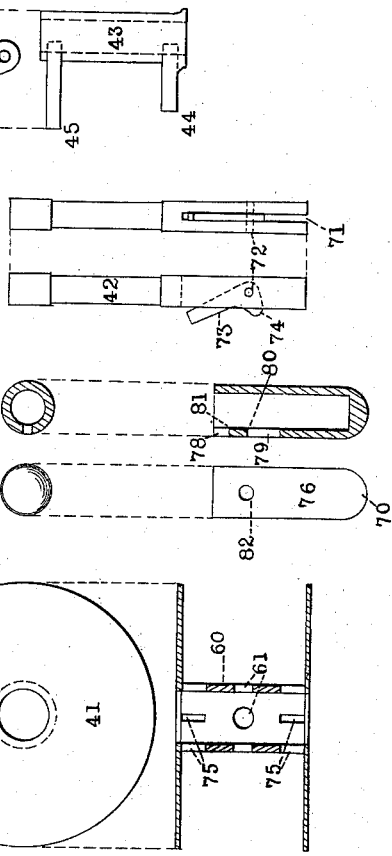
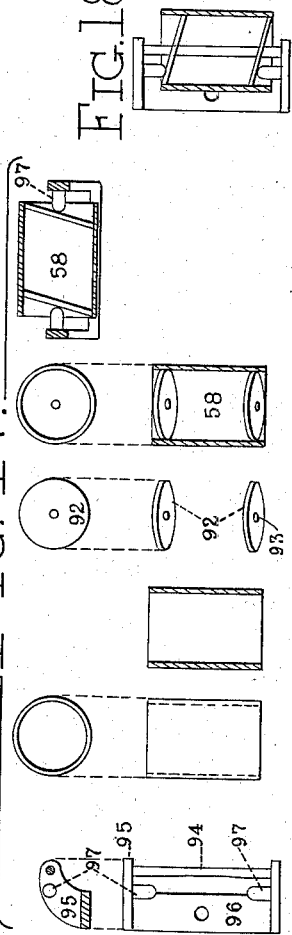
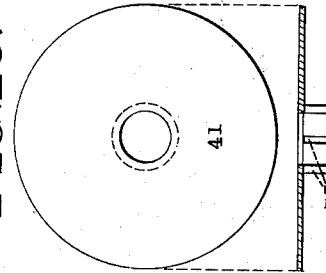
Witnesses
Carl Gabrielson
Knut Scholm
Inventor
Burnham C Stickney
THE NORRIS PETERS CO., PHOTO-LITHO., WASHINGTON, D. C.

UNITED STATES PATENT OFFICE.

BURNHAM COOS STICKNEY, OF ELIZABETH, NEW JERSEY.

TYPE-WRITING MACHINE.

SPECIFICATION forming part of Letters Patent No. 609,476, dated August 23, 1898.

Application filed July 30, 1896. Serial No. 601,024. (No model.)

*To all whom it may concern:*

Be it known that I, BURNHAM COOS STICKNEY, a citizen of the United States, and a resident of Elizabeth, in the county of Union and State of New Jersey, have invented certain new and useful Improvements in Type-Writing Machines, of which the following is a specification.

My invention relates to the ribbon movements of type-writing and other machines employing an ink-ribbon—such as cash-registers, date-stamps, &c.—and it relates also to the method of propelling the paper-carriage and operating the carriage-alarm of type-writing machines, and has for its object to provide practicable devices whereby the ribbon may be moved lengthwise and automatically switched or reversed at the end of its lengthwise movement without requiring special adjustment by the operator with reference to the switching mechanism, and whereby ribbons of various lengths may be used indiscriminately in connection with the switching mechanism; to provide detachable, transposable, and endwise-reversible ribbon-spools, the construction and arrangement being such that the ribbon and spools may be detached bodily from the machine without disconnecting the ribbon from either spool, and the spools transposed in position, or the ribbon and spools turned bodily over to expose the other surface of the ribbon to the impact of the types and prolong the life of the ribbon, the longitudinal feed and automatic reversal of the ribbon duly taking place in whichever position the ribbon and spools may be placed, and the ribbon, together with the spools, being detached and replaced by simple operations, without reference to the switching mechanism; to provide improved means for securing uniform wear of the ribbon widthwise, the widthwise motion being secured by means arranged independently of the winding and switching mechanism, the combination and arrangement being such that the operator needs only to attach the ribbon to the spools in the usual way, without fastening projections on the ribbon or other manipulation or special adjustment, whereupon the ribbon will feed lengthwise and widthwise and automatically reverse its lengthwise motion, and such that the ribbon, together with the spools, may be bodily detached and the spools and ribbon transposed or turned over or another pair of spools slipped on the machine, bearing a ribbon of different color or length, without interrupting the lengthwise, widthwise, or reverse movements.

The invention further consists in improved means for adjusting the carriage-alarm to signify the approach of the end of the line of writing; and it further consists in the various features of construction and combinations of devices hereinafter more fully described, and particularly pointed out in the appended claims.

Figure 6:
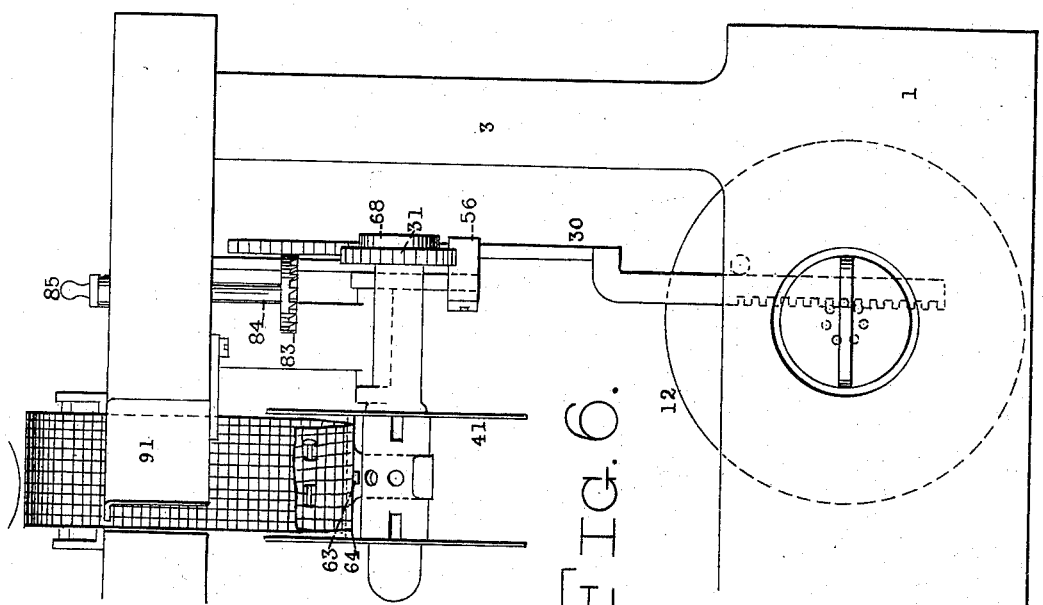
Figure 11:
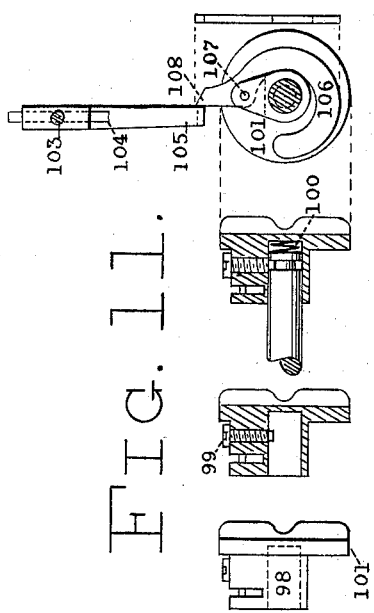
Figure 10:
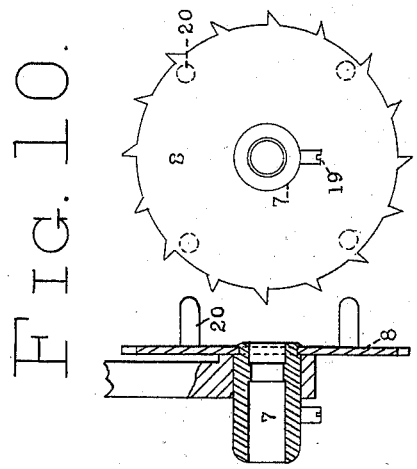
Figure 12:
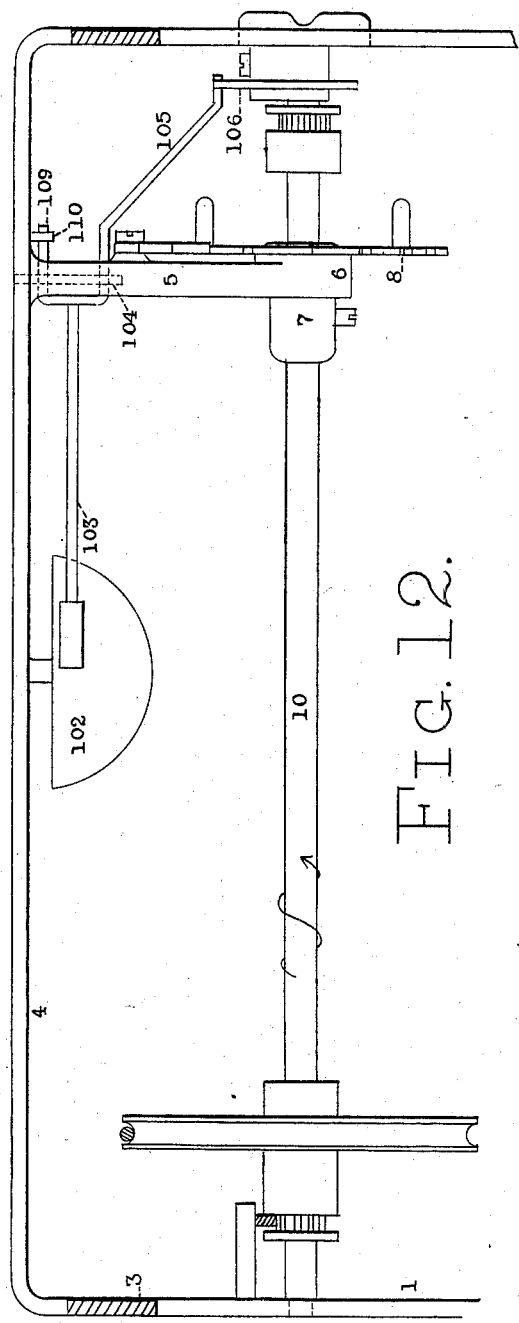

In the accompanying drawings, Figure 1 is a sectional front elevation of so much of a type-writing machine as is necessary to illustrate my improvements. Fig. 2 is a rear elevation showing substantially the same mechanism as Fig. 1, the ribbon being entirely unwound from one spool and the automatic switching action being about to take place. Fig. 3 is a like view to Fig. 2, but showing the position of the various parts when the automatic switching or reversing action is about half finished. Fig. 4 is a view illustrating the method of arranging the spools after turning the spools and ribbon over to expose the other surface of the ribbon to the types, the empty spool having been, if necessary, manually brought to its winding position and the ribbon beginning to wind thereon. Fig. 5 is a view similar to Figs. 2 and 3, but showing the automatic reversal as having been completed and the ribbon beginning to wind upon the empty spool. Fig. 6 is an elevation of the rear portion of the right-hand side of the machine. Fig. 7 is a sectional view taken about centrally of the machine and showing an elevation of the left-hand side of the machine. Fig. 8 is a plan of the ribbon motion, the pawls and springs having been omitted for the sake of clearness. This view shows the mechanism as it would appear if the top plate of the machine were removed. Fig. 9 is a plan of the rear portion of the top of the machine, showing a portion of the paper-carriage. Figs. $9^a$, $9^b$, and $9^c$ illustrate a method of connecting the ribbon-pulleys so they will reciprocate in unison. Fig. 10 shows details of the carriage-tension-adjusting mechanism. Fig. 11 shows detail views of the carriage-alarm-adjusting mechanism. Fig. 12 is a plan showing the rear portion of the base of the machine, including the carriage-driving shaft. Fig. 13 shows details of the ribbon-spool. Fig. 14 shows details of the ribbon-spool supporting and detaching mechanism. Fig. 15 shows a sectional view of the spool with its holding and detaching mechanism assembled. Fig. 16 illustrates the method of detaching the spool. Fig. 17 shows details of one of the reciprocating ribbon-pulleys. Fig. 18 shows a sectional plan of the pulley when in its extreme forward position.

In the several views the same numeral of reference will be found to designate the same part.

1 represents the side wall of the base of the machine; 2, the top plate or type-bar ring, to which is secured the usual circularly-arranged system of type-bars, only one of which is shown; 3, the usual posts extending up from the base to support the top plate, and 4 the rear wall of the base.

*Carriage-driving mechanism.*—The carriage-driving shaft is arranged transversely in the base of the machine, one end of the shaft being supported in the side wall and the other support therefor consisting of an arm projecting inwardly from the rear wall. As shown clearly in Figs. 7 and 12, the forwardly-projecting horizontal arm 5 is cast integrally with the rear wall 4 and is formed at its forward end with a boss 6. In this boss is revolubly mounted the usual carriage-tension-adjusting ratchet-wheel 8 by means of its hollow hub 7. This hub or bushing passes through the boss 6 and projects at the other side, and to this projecting portion one end of the carriage-propelling spring is attached. Arranged in engagement with the ratchet-wheel 8 is the usual adjusting-pallet 9. The driving-shaft 10 is mounted at the left-hand end at 11 in the side wall of the base and, extending across the machine, passes through the hollow hub 7, which constitutes a second support for the shaft. The shaft is provided with a sheave 12, formed with a hub 13, and attached to the sheave is a cord 14, which extends up to a pulley 15, secured to the top plate, and passes thence horizontally to a suitable connection with the carriage-rack 16. The carriage-propelling spring 17 is wound around the shaft for the major portion of the shaft's length, one end of the spring being secured at 18 to the hub 13 of sheave 12, which is rigidly attached to the shaft, and the other end being attached to a screw 19, set into the hub 7 of the ratchet-wheel, which is provided with several handles 20. Any desired tension of the spring may be secured by the usual manipulation of the ratchet-wheel and pallet. As usual, the spools are arranged one on each side of the type-bar system and disposed edge by edge—that is, with their flanges lying in transverse vertical planes.

*To feed the ribbon lengthwise.*—Each ribbon-spool is provided with a ratchet-wheel and driving-pawl, the pawls being of peculiar formation and action. Each pawl is actuated by the carriage-driving shaft and extends vertically therefrom to its associated ratchet-wheel. At its lower end the pawl is provided with a series of cogs or teeth to engage a pinion fixed on the shaft, so that as the shaft rotates in one direction or the other the pawl is moved lengthwise up or down. The pawl is also provided at its upper end with a series of ratchet-teeth, and as it moves down it will engage and rotate the ratchet-wheel and spool, and as it moves up it will slip idly over the teeth of the ratchet-wheel. A spring is arranged to press the upper end of the pawl into engagement with the ratchet-wheel.

The hub 13 of sheave 12 is provided with a pinion 21, which may be of any desired formation, but which preferably is composed of a circular series of pins confined between the hub 13 and a flange 22. The vertical pawl 23 gears with the pinion at its lower end and with the ratchet-wheel 24 at its upper end, and when the carriage is moving in letter-space direction the pawl moves downwardly under the rotation of shaft 10 and rotates the ratchet-wheel 24 and spool 25. Spring 26 presses the upper end of the pawl into engagement with the ratchet-wheel. A holding-pawl 27, acting by gravity and having only two or three teeth, engages with the ratchet-wheel 24 and prevents reverse movement thereof. Similar rotating mechanism is provided for the other ribbon-spool, the shaft 10 being provided at the opposite side of the machine with a like pinion 28, having a like flange 29, and with this pinion engages a like pawl 30 for rotating ratchet-wheel 31, which is provided with a like holding-pawl 32. At Fig. 2 the two pawls just mentioned are shown as disengaged from the ratchet-wheel 31 during the unwinding movement of associated spool 41.

Projecting inwardly from the side walls of the base are horizontal pins 33 34, which prevent accidental rearward displacement of the rack-pawls 23 30, which are also secured against sidewise displacement by the hubs and flanges before mentioned.

Spring 17 being wound around the shaft 10 for a considerable distance, a substantially uniform power is exerted upon the carriage during its entire travel, the pressure exerted by the spring at the end of the line of writing being so nearly the same as that exerted at the beginning of the line that the difference is of no practical moment. By mounting one end of the shaft in the side wall, as at 11, and having the other support consist of the tension-adjusting wheel 8, mounted in an inwardly-projecting arm, I am enabled to confine the shaft, spring, sheave, and adjusting means in the base of the machine, where they are inconspicuous and at the same time within convenient reach for manipulation and repairs. By mounting the shaft transversely I am enabled to arrange means at each end of the shaft for rotating the ribbon-spools thereabove, and by placing the transverse shaft below the ratchet-wheels I am enabled to employ pinions fixed on the shaft and meshing with vertically-arranged rack-pawls, whereby the power exerted by the carriage-spring is transmitted directly to the ribbon-spool ratchets without intervening cams, shafts, and levers. By prolonging the shaft beyond one of its supports I am enabled to place an adjustable cap for operating the carriage-alarm on the end of the shaft and to arrange the cap to protrude slightly through the side wall of the base, where it can be easily perceived and manipulated. This also permits the arrangement of the bell and hammer within the base, where they are inconspicuous and easily accessible.

*Switch for automatically reversing longitudinal feed of ribbon.*—In Fig. 2 the spool 25, upon which the body of the ribbon has been wound in the manner above described, is shown in an elevated position, while the empty spool 41 is shown in a depressed position. The rack-pawl is still in engagement with the full spool 25, but owing to the fact that the empty spool can pay out no more ribbon the full spool is prevented from further rotation. The switching mechanism is inactive during the unwinding movement of either spool, but is brought into action by the stoppage of such spool, as will now be explained. The full spool being held against winding any further, the further downward progress of the rack-pawl operates to swing downwardly both the ratchet-wheel and spool, while at the same time the empty spool is swung upwardly, as it is connected to the full spool to swing therewith. This motion of the spools is a lateral motion, as distinguished from the endwise spool motion usual in type-writing machines. During the depression of the full spool and elevation of the empty spool the heretofore active rack-pawl is switched out of engagement with its associated ratchet-wheel, and the heretofore inactive pawl is switched or let into engagement with its associated ratchet-wheel and operates thereafter to wind the ribbon upon the empty spool. As soon as that becomes full the switching operation is repeated, so that the ribbon continues to wind back and forth without attention from the operator.

Arranged at each side of the machine is a pivoted frame which vibrates in a vertical plane transversely of the machine—*i. e.*, in the same vertical plane in which the ribbon-spools rotate. These frames are pivoted in brackets that extend downwardly from the top plate, and they are provided with suitable bearings for the shafts of the ribbon-spools. They are connected by a horizontally-arranged link and vibrate simultaneously, one spool swinging up as the other swings down, during which operation the ribbon is carried bodily along for a distance equal to the extent of the vibration. Either spool may be elevated or depressed manually, if desired, or either driving-pawl will swing its associated frame downward and the other upward whenever the ribbon becomes so taut as to prevent the elevated spool from winding freely.

Referring now to Fig. 8, the ribbon-spool 25 is supported upon the front end of a shaft which is revolubly mounted in the pivoted frame 36. The details of the spools and shafts are shown at Figs. 13 to 16 and will be hereinafter described. The frame 36 is provided with two inwardly-extending arms 37 38, which embrace the lower end of the bracket 39, fixed to the top plate 2. The frame 36 is pivoted at 40 to the bracket, the pin being passed through the arm 38, the bracket, and the arm 37. The opposite ribbon-spool 41 is likewise mounted upon a shaft 42, which is mounted in a similar pivoted frame 43, provided with like arms 44 45, Fig. 14, by which it is pivotally mounted in like manner at 46 to the bracket 47. These frames 36 and 43 are connected by a transverse link or bar 48, the same being pivoted at each end to arms depending from the respective frames—at 49 to arm 45 of frame 43 and at 50 to arm 38 of frame 36, Fig. 2. The link extends across the machine beneath the type-bars and so connects the spools that when either is depressed the other is elevated.

To retain the pivoted frames in position at either end of their vibratory movement, a double-acting spring 51 is provided, it being pivotally mounted at 52 upon the bracket 39 and at 53 being pivotally connected to an arm 54, extending upwardly from the vibratory frame 36. The spring is arranged to bear upon either side of the pivot 40, so as to hold the frame 36 either elevated or depressed, and thereby, through the link 48, hold the other vibratory frame in its corresponding position. A suitable stop for limiting the vibration of the frames will be presently described. A double-acting weight would serve in place of the spring, though I preferably employ a spring, as being lighter and less bulky. The link 48 serves also as a switch to disengage and engage the driving-pawls and holding-pawls with their respective ratchet-wheels, and for this purpose is provided at its ends with rearwardly-extending fingers 55 56. At Fig. 2 the finger 55 stands idle, while finger 56 is withholding the rack-pawl 30 and detent-pawl 32 from engagement with ratchet-wheel 31. At Fig. 3 both fingers are idle, the spools being shown as having reached a midway position in the switching operation and all four of the pawls being for the moment in engagement with the ratchet-wheels, as will be hereinafter explained, and at Fig. 5 the link 48 is shown as having arrived at the opposite extreme of its horizontal movement, in which position the finger 56 is idle, while the finger 55 has withdrawn the pawls 23 and 27 from ratchet-wheel 24. The holding-pawls 27 and 32 are provided at their lower ends with enlargements 57, wherewith the fingers contact when swinging the pawls out of engagement. The pawls 27 and 32, besides preventing reverse rotation of the ratchet-wheels, serve also to prevent reverse vertical movement of the pivoted frames should it happen at any time that the automatic switching operation be only partially completed when the paper-carriage is retracted to begin a new line and the driving-pawls are consequently carried upward, and for this purpose each holding-pawl is provided with a short series of teeth, so that it can perform this function during any portion of the downward movement of the frame and prior to its disengagement from the frame.

During the winding of the ribbon on spool 25 the rack-pawl 30 is held by the finger 56 in a slightly-inclined position, so that it cannot engage the teeth of the ratchet-wheel 31, as shown at Fig. 2, so that the ribbon-spool is free to rotate in a reverse direction as the ribbon unwinds therefrom, although the pawl 30 moves up and down in unison with the other rack-pawl as the shaft 10 rotates back and forth.

During the winding movement of spool 25 the ribbon is delivered from spool 41 and passes up and over the pulley 58, thence across over the type-bars and beneath the platen to pulley 59, and thence downwardly to spool 25.

I will now explain more fully why the switching mechanism is called into action by the cessation of the unwinding movement of either spool. Referring now to Fig. 2, it will be observed that during the actuation of the ratchet-wheel 24 the driving-pawl exerts a downward pressure not only upon the ratchet-wheel itself, but equally well upon the pivoted frame in which the wheel is mounted. For this reason there is a constant tendency of the pivoted frame to vibrate downwardly; but this tendency is constantly resisted by the double-acting spring 51, which is made of such strength as to just withstand this downward dragging of the rack-pawl—that is, as long as no obstruction exists to the free passage of the ribbon from spool to spool, it is easier for the ratchet-wheel to rotate under the stress of the rack-pawl than it is for the frame to vibrate under that stress. Consequently the frame maintains its elevated position and the spool rotates until the other spool ceases to unwind, when, of course, the full spool can wind no more, and offers considerable extra resistance to being rotated by the rack-pawl. The rack-pawl, therefore, under the action of the carriage-spring, begins to press or drag with extra force upon the ratchet-wheel; but before this pressure has increased to any considerable degree the spring 51 yields, permitting the rack-pawl to swing the ratchet-wheel, spool, and frame bodily downward. During such movement the other spool, ratchet-wheel, and frame are carried bodily upward, and the portion of the ribbon between the spools and extending across the machine is carried bodily along in the same direction in which it has been feeding—i. e., the longitudinal feed of the ribbon is prolonged to an extent equal to the distance through which the spools vibrate.

In the operation just described the extra work thrown upon the descending rack-pawl is very slight, since the entire weight of the ribbon is upon the descending spool, so that gravity assists materially in the reversing operation. Furthermore, as the keys are operated and the paper-carriage is fed across the machine the entire machine jars and vibrates to a considerable degree, and this jarring acts upon the heavy spool to shake it down or cause it to settle. For these reasons only an imperceptible amount of power from the carriage-spring is required to effect the switching operation, so that the prompt motions of the paper-carriage are not interfered with.

As soon as the double-acting spring 51 passes over the dead-center its pressure is exerted on the opposite side of the pivot of the vibrating frame, and therefore assists in the downward motion thereof, its leverage becoming greater as the frame continues to swing until the latter portion of the downward movement of the frame is effected entirely by the action of the spring.

The switching mechanism is therefore called into action by the cessation of the paying off of the ribbon from the delivery-spool. Nevertheless the ribbon continues to move longitudinally past the printing-point during the entire switching operation owing to the described lateral movement of the spools.

During the lateral motion of the spools the bar or link 48 is actuated to engage the idle pawls and disengage the operative pawls. As the frame 36 turns on its pivot it forces the bar 48 toward the opposite side of the machine, thereby causing the frame 43 to vibrate and carry the empty spool 41 upward. During the early portion of the traverse of the bar 48 the idle rack-pawl 30 and holding-pawl 32 are let into reëngagement with the ratchet-wheel 31, the former being actuated by the spring 26 and the latter by gravity, as shown at Fig. 3, and during the latter part of the traverse of the bar 48 the finger 55 at the other end thereof contacts with the rack-pawl 23 and holding-pawl 27 and swings them to an inoperative position. The ribbon will now by the further descent of the pawls begin to wind upon the empty spool, as shown at Fig. 5. It will be observed that when the ribbon becomes taut by reason of the cessation of the unwinding movement of the delivery-spool the active pawl 23 calls the switching mechanism into operation and that the switching operation is completed independently of the pawl 30 and rotary driver 31 associated with the empty spool—that is to say, the members 30 and 31 do not hinder, block, or delay the switching operation—and it will be further observed that the rewinding of the ribbon upon the empty spool begins at once. An important feature of this switching mechanism lies in the fact that the disengagement of the active pawl from its ratchet-wheels is arranged to take place after the double-acting spring has passed over the dead-center and when there is no further active opposition to the longitudinal movement of the ribbon, and it is therefore relieved from longitudinal strain or tension, since at this moment there is practically no resistance to the further downward progress of the rack-pawl and consequently no perceptible pressure of the pawl-teeth upon the teeth of the ratchet-wheel, so that there is no frictional opposition to the withdrawal of the rack-pawl from the ratchet-wheel. Furthermore, the pawl is permitted to remain in engagement with the ratchet-wheel until the double-acting spring has acquired sufficient leverage to force the ratchet-wheel down in advance of the downward movement of the pawl, while at the same time the finger 55 contacts with the pawl and moves it laterally inward, so that there is in fact no rubbing contact between the pawl-teeth and the ratchet-wheel teeth during the separation of one from the other. While the ribbon is still in longitudinal motion past the printing-point the driving-pawl, with its associated holding-pawl, is disengaged from the ratchet-wheel without obstruction or friction. The disengagement of the driving-pawl requires so little power that the double-acting spring need be only sufficiently strong to resist the before-mentioned downward drag of the pawl during the winding of the ribbon on the spool.

An easily-operating switching mechanism is essential in this class of machines, since should it happen that the tension on the ribbon be greatly increased at the switching moment the spool would turn inside the ribbon. It would be easier for the spool to turn inside the ribbon and wind the coils of ribbon more tightly than it would for the switching mechanism to operate should its operation involve the placing of any great longitudinal strain upon the ribbon. The ribbon would remain quite stationary at the printing-point, the ink would be rapidly exhausted from the ribbon at that spot, and a hole would soon be worn, rendering the automatic switching mechanism quite unsuitable for practical use. Furthermore, so much extra demand would be made upon the carriage-propelling spring to overcome such obstruction that insufficient force would remain in the spring to move the carriage promptly, so that the types would strike improperly or print one on top of another, which of course would further render the switching mechanism impracticable.

The switching mechanism will be called into action whenever the ribbon ceases to unwind from either spool, so that after being placed in the machine it will wind back and forth without attention from the operator until worn out.

Referring again to Fig. 3, it will be observed that the switching operation is half finished. The spools, pivoted frames, link 48, and double-acting spring are all in a midway position. From this point the weight of the full spool, assisted materially by the jarring of the machine in operation, will be found in practice sufficient to complete the reversing operation; but to insure the proper completion of the switching movement the driving-pawl 23 is arranged to remain still longer in active coöperation with its associated ratchet-wheel and pivoted frame, so that in its further descent it carries down the spool and swings the frame until the double-acting spring 51 has acquired such leverage as to completely control the entire apparatus and force it to the limit of its switching motion, during which the finger 55 contacts with pawls 23 and 27 and carries them to the inoperative position shown at Fig. 5.

It will be observed at Fig. 3 that both driving-pawls stand in operative relation to their associated ratchet-wheels and appear to be pulling the ribbon in opposite directions; but in practice no harm results, since in the first place the empty spool can be rotated through a short distance before it really begins to wind. In the second place the premature winding of the empty spool may cause the full spool to pay off a scarcely perceptible length of ribbon during its descending motion without doing any harm, the coils of course winding a little closer thereon. In the third place the superior weight of the full spool will in practice cause it to descend in advance of its actuating-pawl—i. e., the reversing action will tend to take place independently of the downward movement of the pawls—and in the fourth place the contrariwise action of the pawls upon the ribbon exists for only a short time—too short, indeed, to permit any harmful result. If desired, means may be provided for permitting the empty spool to rotate independently of the ribbon during the switching operation, which means will now be described.

*Method of attaching ribbon to spools.*—The ribbon is not secured directly to the core of the spool in the usual manner, but is attached instead to a spring which surrounds the core, so as to be capable of rotating thereon, but which is normally held against such independent rotation. When the ribbon is unwound from the spool and the tension thereon is increased, the spring will be released, so that the spool may rotate without rotating the spring; but when during the switching operation the longitudinal strain on the ribbon is relieved, as described, the spring reëngages the core of the spool, so as to be rotated thereby to wind the ribbon thereon. Referring to Figs. 1, 6, 8, and 13, each spool-core 60 is provided with a circumferential series of perforations 61. Embracing the core is a C-shaped spring 62, having a projection 63, normally entering one of the perforations 61. The spring is also provided with a loop or eye 64, to which the ribbon is attached in any suitable manner—as, for instance, it may be passed through the loop, folded back, and pinned to the body of the ribbon, as shown at Fig. 6, or a short piece of tape may be secured to the spring and the ribbon then pinned to the tape in the usual manner.

When the ribbon is all paid off the spool, the continued actuation of the full spool increases the longitudinal strain on the ribbon, whereby the spring 62 is flexed sufficiently to withdraw the projection 63 from the perforation 61, as shown clearly at Fig. 1. Such a merely yielding connection between the ribbon and the spool will be found sufficient in practice to prevent undue strain on the ribbon during the temporary premature winding of the empty spool; but to insure against all possibilities of harm it will be seen from an inspection of Fig. 1 that when the projection 63 has been withdrawn from the perforation the spool may be rotated to an unlimited extent without winding the ribbon thereon or increasing the tension on the ribbon or in any way retarding the action of the switching mechanism. When, however, the strain on the ribbon is relieved, as described, the spring will resume its normal shape, the projection 63 reëngaging one of the perforations, either immediately or as soon as the spool is rotated to bring the perforation beneath the projection, and the spring will then rotate with the spool, winding the ribbon thereon.

*Coöperating means to prevent wearing a hole in the ribbon.*—To reduce the liability of the full spool to continue winding independently of the ribbon after the other spool becomes empty, thereby winding the ribbon more tightly on the full spool and causing a hole to be worn in the ribbon, as above explained, I have provided means for winding the coils of ribbon tightly on the winding-spool, particularly the first or inner coils, where the ribbon is most likely to yield when subjected to additional tension. As will be perceived, the smaller the diameter of the core 60 the greater is the liability of the ribbon to yield in this way.

Each of the vibrating frames is provided with a stop to limit the extent of its downward motion, and each ribbon-spool shaft is provided with a collar so situated that at the descent of the frame the collar comes into contact with the said stop and is held against the stop by the action of the above-mentioned double-acting spring 51. By this means a frictional opposition to the unwinding of the spool is set up, whereby extra force is required to wind the ribbon upon the other spool, so that the coils will wind with a moderate degree of tightness thereon.

Referring to Figs. 2 and 8, I have attached to bracket 47 at point 65 an elbow-like projecting piece 66, provided with an outwardly and downwardly projecting horn 67. Attached to ratchet-wheel 31 is a large boss or hub 68, the periphery whereof is in frictional contact with the horn 67. More friction, if desired, may be secured by enlarging the diameter of the boss. The pressure of the double-acting spring 51 is transmitted through frame 36, link 48, and frame 43 and serves to press the boss 68 against the horn-stop 67, thereby causing the ribbon to wind with the desired tension or tightness on the spool 25.

The amount of friction on the boss 68, and consequently the degree of tightness with which the ribbon winds upon the spool 25, depends upon the strength of double-acting spring 51. It will be borne in mind that the obstruction or resistance offered by this spring must be overcome at the beginning of the switching operation without subjecting the ribbon to sufficient tension to cause the spool to turn inside of the ribbon, and it will readily be understood that as the spring 51 is strengthened or weakened, requiring either more or less ribbon-tension to overcome its resistance, so will the frictional resistance be correspondingly more or less and the ribbon be caused to wind more tightly or loosely on the winding-spool. In other words, the spring cannot be strengthened and the amount of its resistance increased without corresponding increase in the degree of tightness with which the ribbon is wound on the spool, so that there is no increase of liability of the spool to turn inside of the ribbon at the critical moment.

When the ribbon begins winding on the empty spool, the weight of the body of the ribbon which is on the depressed spool coacts with the spring 51 in producing frictional resistance. The friction lessens as the ribbon gradually accumulates on the winding-spool, where it acts in opposition to the spring 51. Thus the first coils are wound the tightest, which is an advantage, as these would be most likely to yield when undue tension is put upon the ribbon. As the spool fills each rotation thereof winds up more ribbon, so that each revolution of the spool makes a greater demand upon the carriage-propelling spring. At the same time the friction is diminished with each revolution, so that on the whole the demand made upon the carriage-spring is practically uniform during the entire operation of winding and reversing or switching the ribbon.

As already indicated, the weight of the ribbon on the full spool is almost sufficient to offset the resistance of the double-acting spring 51, so that the switching mechanism operates by an inappreciably slight extra tension on the ribbon.

The frictional resistance to the longitudinal movement of the ribbon is entirely eliminated at the cessation of the unwinding of the delivery-spool. During the switching operation the ribbon moves along without artificial obstruction, as will be seen by reference to Figs. 2, 3, and 5, by which it will be seen that the stop 67 offers frictional resistance to the rotation only, but not to the ascent, of the spool, as contact between boss 68 and horn 67 ceases when such ascent begins. During the winding operation a demand is made upon the carriage-propelling spring to overcome the artificial resistance to the unwinding of the delivery-spool. At the cessation of the unwinding movement this demand ceases, and instead thereof a demand is made upon the spring for power to operate the switching mechanism. The demand upon the spring is made thus practically uniform throughout the two operations of winding and switching, so that when the tension of the spring is adjusted to feed the carriage promptly during the winding of the ribbon it will be found to move the carriage promptly during the reversal also. Bracket 39 is provided with a like stop 69, which acts in like manner upon its associated boss to frictionally oppose the winding of the ribbon on spool 41, as will be observed by reference to Fig. 5. The boss or collar associated with the winding-spool is always out of contact with its associated friction-stop, so there is no artificial opposition applied to either spool when winding, which would be undesirable and consume power unnecessarily. Brackets 66 and 69 also serve as guides for rack-pawls 30 and 23.

A peculiar and specially valuable feature of my invention lies in the fact that notwithstanding the switching mechanism is called into action by the cessation or failure of the empty spool to deliver any more ribbon to the winding-spool yet after the stoppage of the empty spool and during the actuation of the switch the longitudinal feed of the ribbon past the printing-point is prolonged, whereby fresh portions of the ribbon are exposed to the wear of the types.

By the contrivance of laterally-swinging ribbon-spools I am not only enabled to secure the prolonged longitudinal feed of the ribbon just referred to, but am also enabled to adopt the expedient of employing the spool-rotating pawls or devices for the additional purpose of operating the switching mechanism direct immediately the unwinding movement ceases. I am also thereby enabled to provide the described means for frictionally retarding the passage of the ribbon to the winding-spool, for the purpose set forth, without artificially opposing the rotation of the winding-spool also and to relieve the ribbon of frictional opposition during the switching operation. By the use of laterally-swinging spools I am also enabled to gain the signal advantage of winding the ribbon upon the elevated spool, so that its weight will assist in the switching operation in the manner set forth. Additional advantages possessed by this mechanism will be hereinafter referred to.

I believe myself to be the first to devise, in a machine wherein a switch is mechanically operated at the cessation of the unwinding movement of a spool, means whereby the ribbon is kept in motion longitudinally past the printing-point during the actuation of the switch notwithstanding the empty condition of the delivery-spool. In carrying out my invention the detail construction may be widely varied. So long as the portion of the ribbon at the printing-point is kept in motion it is immaterial whether or not the remainder of the ribbon is moved.

Various constructions may be employed for mechanically imparting a lateral movement to the spool to call the switch into action. I prefer to move the spools simultaneously; but this is not essential so long as either spool is moved laterally. If other means than those shown are employed to actuate the spool-winding wheel, the same means may be utilized to impart lateral movement to the spools. So long as the spools are enabled to move laterally in vertical planes it is immaterial whether they be mounted upon a pair of swinging frames or otherwise. I prefer the elastic connection of the ribbon to the spool; but this is not essential. The ribbon may be temporarily released from the spool by other means or not released at all, although I prefer to employ a releasing device. A variety of means may be employed for frictionally opposing the movement of the delivery-spool.

*Spool and ribbon detachment.*—Referring now more particularly to Figs. 13 to 16, each spool is provided at its forward end with a centrally-arranged yielding projection or plunger 70 76, pressure upon which will release the spool, so that it may be slipped off from the machine. The spool-shaft 42, Fig. 14, is slotted at its forward portion for nearly half its length at 71. About midway of this slot a pin 72 is driven transversely through the shaft, and upon this pin is pivotally mounted a detent 73, which is provided with a short angularly-arranged arm 74. The ribbon-spool core 60 is provided at each end with a circularly-disposed series of longitudinal slots 75, Fig. 13, and the detent 73 is adapted to enter or project into any of said slots, thereby securely holding it against withdrawal and also compelling the spool to rotate with the shaft. The means for operating the detent to release the spool will now be described.

The spool is not mounted directly upon the shaft; but the core thereof is bored to fit over a sleeve 76, which thus constitutes the support of the spool. The sleeve in turn fits over the forward end of the shaft and is supported thereon so as to be capable of sliding but preferably incapable of turning on the shaft. The sleeve is considerably prolonged beyond the front end of the shaft and at its forward or free end is capped or provided with a head, as 70, which protrudes from the forward end of the spool, where it is readily perceived and manipulated. An open space exists between the forward end of the shaft and the bottom of the hole in the sleeve, wherein is placed a compression-spring 77, the office of which is to hold the sleeve 76 in its normal forward position. The sleeve is provided at its rear end with a short longitudinal slot 78 to permit the passage of the arm 73 of the detent and is also provided with another slot 79 at a point directly forward of 78. The short arm 74 of the detent plays in the slot 79 of the sleeve. As the spring 77 presses the sleeve forward the point 80 of the sleeve bears against the short arm 74 of the detent and thereby holds the rear end of the pawl up in the ribbon-spool slot 75 as far as it will go, thereby preventing the accidental withdrawal of sleeve 76 from the shaft, as well as locking the ribbon-spool to the shaft. When it is desired to remove the spool, the cap 70 is pressed back, as shown at Fig. 16, whereupon the point 81 of the sleeve bears against the detent and forces it to vibrate inwardly toward the axis of shaft 42 until, as the detent reaches the position shown at Fig. 16, the spool becomes unlocked and may be slipped off. In practice the operator may grasp the spool, as shown at Fig. 16, placing his thumb on the cap 70 and his fingers on the rear flange of the spool, whereupon without appreciable effort the spool will come off in his hand. The remaining parts will then resume the position shown at Fig. 15. To replace the spool, it is only necessary to slip it onto the sleeve 76 and press it back as far as it will go. During such operation the flange of the spool will bear upon the detent and cause it to vibrate inwardly, as before, whereby the sleeve 76 will be forced back a trifle and the spring 77 compressed, and when, as the shaft is turned by the winding mechanism, the detent arrives opposite one of the slots 75 in the core of the spool it will under the pressure of the spring 77 enter the slot and lock the spool to the shaft. The circularly-disposed slots 75 are arranged at preferably frequent intervals, so that the shaft cannot turn much without enabling the detent to engage one of the slots. In practice, after slipping the spool upon the shaft, the operator rotates the spool to take up the slack ribbon, whereby opportunity is given the detent to enter one of the slots. The sleeve is perforated at 82 to permit the ready insertion of pin 72 in assembling the parts. The spools may be readily slipped off without disconnecting the ribbon from either spool and together with the ribbon removed bodily from the machine and another pair substituted bearing a fresh ribbon or one of different color, without regard to its length. The ends of the spool are similar, so that each spool is reversible and may be slipped onto either sleeve either end first, thus permitting the ribbon and spools to be bodily withdrawn without disconnecting the ribbon from either spool and then swung end for end and replaced or turned bodily over and replaced. As indicated at Fig. 9, the paper-carriage has the usual hinge construction, so that it may be lifted to permit ready access to the ribbon and removal thereof.

*To turn the ribbon over.*—Excessive turning of the ribbon when in use may be avoided by turning it bodily over and exposing the other surface to the wear of the types. This may be done by simply withdrawing the spools and ribbon, turning them bodily over, and replacing them. This should be done only when one spool is empty, and it should then, if necessary, be manually swung to its feeding position, as shown by the diagram at Fig. 4. The ribbon will thereafter wind back and forth, as before, without further attention.

*Means for securing even wear of the ribbon.*—As shown at Fig 9, I preferably employ a "shifting" carriage, each type-bar being provided with a lower-case and capital type. The ribbon is arranged centrally of the machine, so that the lower-case types will strike on the front portion of the ribbon. The capital types will strike on the rear portion, but will not perceptibly wear the same, as but few capital letters are generally used. When the front portion of the ribbon has been sufficiently worn, the same may be turned bodily over, as just explained, or it may be taken from the machine and swung around end for end without turning it over, and replaced upon the machine with the spools transposed. In either case the worn portion of the ribbon will be in the rear and the comparatively unworn portion will be in front and therefore exposed to the impact of the lower-case types. I preferably employ a ribbon three-fourths of an inch in width, and in this way a very substantial amount of use can in practice be derived from the ribbon.

As a coöperative device for securing even wear of the ribbon I provide means for causing the pulleys 58 and 59 to have a slight reciprocating motion endwise as they rotate during the passage of the ribbon over them. The ribbon is thus made to move sinously as it traverses the pulleys, so that during repeated winding movements of the ribbon the types wear a wider path than would be worn if the ribbon were to travel in a direct manner. Referring now more particularly to Figs. 17 and 18, it will be observed that each pulley is shaped like a short piece of tube, within which are secured, at the ends thereof, two diagonal disks 92, each disk having a central hole 93, whereby the pulley is enabled to both rotate and slide upon the stationary supporting-pin 94, which is fastened in the ears 95 of a bracket 96, secured to the top plate of the machine. Projecting inwardly from said ears are two short pins or guides 97, rounded at their free ends. The function of these projections is to contact with the diagonal disks 92, and thereby so guide the pulley that it will reciprocate endwise as it is rotated, such endwise motion being due to the slanting position of the disks. A sectional plan of a pulley and bracket is shown at Fig. 18, the pulley having been forced to the extreme forward limit of its movement in the described manner. The ribbon clings to the pulley and is itself carried backward and forward with the pulleys. The pulleys are not connected, and if one should happen to move forwardly while the other is moving rearwardly the spot where the types strike would move in neither direction. The operator may, if he choose, manually regulate the position of the pulleys so they will move in unison. Should he neglect to do so, no harm would result in practice, as little things are constantly occurring to cause the pulleys to change their relative positions, such as being accidentally touched by the hand of the operator or accidentally moved during the inspection or cleaning of the types or by the removal and replacement of the spools, so that the motion of the ribbon will be fitful and irregular; but during repeated winding movements of the ribbon it will wear with substantial evenness a wider path than if the pulleys were incapable of reciprocal movement. In practice I reciprocate the pulleys one-eighth of an inch. If desired, only one pulley need be reciprocatory, or one may be larger than the other or have differently-inclined disks or differently-arranged cams, thus increasing the irregularity of the ribbon movement widthwise, or the pulleys may readily be connected so that they will move in unison, one method of such connection being illustrated at Figs. $9^a$, $9^b$, and $9^c$, whereat it will be observed that a rocker-shaft Z is mounted transversely in the base of the machine below the pulleys. Secured thereto are vertical arms Y, provided at their upper ends with forks X, each of which embraces pulley-shaft 94, which may be prolonged to a suitable extent and mounted loosely in the arms of the pulley-bracket 96. As the pulley 59 reciprocates endwise it rocks the shaft Z by means of the shaft 94, (made fast to the pulley,) fork X, and arm Y, and through the other arm Y and fork X a similar movement is communicated to the pulley 58, which need not be provided with a cam.

It is the usual practice to change or deflect the course of the ribbon during its passage from spool to spool generally by arranging a deflector or turning-support above each spool, the ribbon being passed up from one spool and over the deflector, thence across to the other deflector, and thence down to the other spool. Usually an edge of the top plate serves the purpose of a deflector. It has heretofore been suggested that a pulley be used as a deflector to permit freer longitudinal movement of the ribbon. It will be observed that I have taken advantage of the fact that a ribbon clings to the surface of the support by which its course is deflected in providing means for moving the support or deflector constantly endwise, so that the ribbon, as it passes over and clings or adheres to the deflector, is in consequence constantly moved in widthwise direction. It is obviously immaterial whether the deflector be in the form of a pulley or any other suitable or usual form, so long as it moves endwise in such a manner as to keep the ribbon constantly moving widthwise by reason of its clinging to the surface of the deflector.

*To wind the ribbon manually.*—For this purpose a horizontally-arranged crown-wheel 83, Figs. 6 and 8, is provided, the same being attached to the lower end of vertical shaft 84, mounted in the top plate and provided at its upper end with a crank 85, Fig. 9. Whenever the ratchet-wheel 31 is in its elevated position, it meshes with the crown-wheel 83, and by turning the crank the ratchet-wheel and ribbon-spool will be rotated. If it be desired to manually wind the ribbon on the other spool, the spools must first be transposed in position.

*Ribbon-gates.*—The top plate is slotted or cut away over the spools, as at 86, Fig. 9, to form a passage-way for the ribbon. This passage-way may, if desired, be left open; but I preferably provide a gate 87, pivoted at 88 to the top plate, normally standing closed, but which may be swung open to permit the ready withdrawal of the ribbon and spools from the machine without disconnecting the ribbon from either spool. On the opposite side of the machine the top plate is likewise slotted at 89 and preferably provided with a similar gate 90, here shown in its closed position. Each gate has a downwardly-projecting flange 91, Fig. 6, which conforms to the general formation of the top plate.

*Bell-striking mechanism.*—This mechanism is located in the base of the machine and is operated by the carriage-driving shaft, to the end of which is secured a revolubly-adjustable cap for manipulation by the operator to set the alarm. Referring now to Figs. 1, 11, and 12, the right-hand end of the carriage-driving shaft 10 projects through the hollow hub 7 of the tension-adjusting wheel 8 and extends nearly to the right-hand side of the machine-base. An annular groove is cut in the shaft near its end, into which projects the end of a screw 99, that is set into the cap 98, permitting the rotation of the cap on the shaft, but preventing its withdrawal therefrom. A friction-spring 100 is inserted between the end of the shaft and the inner termination of the hole in the cap, as a result of which it becomes necessary to use considerable force to rotate the cap on the shaft. The cap is provided with a flange 101, from which project wings which protrude beyond the wall of the base, so as to be readily perceived and grasped by the operator. The bell 102 is secured to the base of the machine, and above it is arranged a gravity-hammer 103, pivoted to the base at 104 and provided with a depressible arm 105, wherewith engages a gravity-trip 106, pivoted at 107 to the adjustable cap 98. At the rotation of the shaft the nose 108 of the trip bears down the arm 105, elevating the hammer, and at a predetermined moment the end of the nose, which at this time is moving downwardly and forwardly, will slip off the arm and release the hammer, which falls and strikes the bell. The bell-trip partially surrounds the body of the cap 98, and its hook shape secures it against undue vibration in either direction. Upon the reverse rotation of the shaft the nose 108 of the trip will yield and vibrate, so as to pass the arm 105 without vibrating it. Then the weight of the trip will cause it to resume its normal position above the arm 105. The hammer 103 is provided with a tailpiece 109, which bears against the pin-stop 110 to limit the downward vibration of the hammer. To adjust the alarm, the paper-carriage should be set to the position where it is desired to have the bell strike. Then the wings of the cap should be grasped by the operator and turned until the bell strikes. The bell will thereafter always strike when the carriage reaches the same point in its travel. The friction produced by the pressure of spring 100 is sufficient to prevent the cap from slipping on the shaft when the obstruction of the bell-hammer is met.

The details of construction and arrangement may be widely varied without discarding the essence of the invention or sacrificing the advantages secured thereby. It will be observed that portions of the invention may be used without others.

What I claim herein as new, and desire to secure by Letters Patent, is—

1. The combination with a ribbon of a ratchet-wheel, a pawl, and a pinion connected to the carriage-driving mechanism and adapted to actuate the pawl, the pawl being provided with teeth to engage the ratchet-wheel, and also with teeth to engage the pinion, substantially as set forth.

2. The combination with a ribbon of a ratchet-wheel, a pawl, a pinion for actuating the pawl, the pawl being provided with teeth to engage the ratchet-wheel and also with teeth to engage the pinion, and a spring for pressing the pawl into engagement with the ratchet-wheel, substantially as set forth.

3. In a type-writing machine, the combination with a ribbon, a pair of spools and a pair of ratchet-wheels of a transverse carriage-driving shaft provided with a pair of pawls for actuating the ratchet-wheels and provided also with a sheave, and a cord attached at one end to the sheave and at the other end to the carriage, substantially as set forth.

4. The combination with a ribbon, a pair of spools and a pair of ratchet-wheels of an actuating-shaft, a pair of pinions thereon and a pair of pawls adapted to be actuated by said pinions and in turn to actuate said ratchet-wheels, substantially as set forth.

5. In a type-writing machine, the combination with a ribbon, a pair of spools, one located at each side of the machine, and a pair of ratchet-wheels, of a carriage-driving shaft mounted transversely at the base of the machine and provided with a pair of pinions, and a pair of pawls geared to the pinions and extending to the ratchet-wheels, substantially as set forth.

6. The combination with a ribbon of a spool arranged to rotate and means for mechanically swinging the spool in the plane of its rotation, substantially as set forth.

7. The combination of a ribbon, a pair of spools, a pair of eccentrically-pivoted supports, and a link pivoted at each end to one of the supports, and serving to transmit the motion of one to the other, substantially as set forth.

8. The combination with a ribbon of a pair of reciprocatory spools, each being adapted to receive and wind the ribbon while at one end of its reciprocal movement and to pay out the ribbon while at the other end of such movement, and means for mechanically moving either spool to its winding position and simultaneously moving the other spool to its delivering position, substantially as set forth.

9. In a type-writing machine the combination with a pair of spools arranged at the sides of the machine and a ribbon arranged across the machine and extending down to the spools, of means for mechanically elevating either spool and simultaneously depressing the other spool, substantially as set forth.

10. The combination of a ribbon, a spool, a ratchet-wheel, a driving-pawl, and a pivoted support provided with a switch to alternately engage and disengage the pawl and ratchet-wheel, substantially as set forth.

11. The combination with a ribbon of a pair of reciprocatory ribbon-spools, a pair of reciprocatory supports therefor, means for connecting the supports so that they will move simultaneously, and a double-acting spring arranged to act upon both supports to hold them at either end of their reciprocal motion, substantially as set forth.

12. The combination with a ribbon of a spool, a ratchet-wheel, a pivoted support therefor, a driving-pawl, a switch, and a double-acting spring, substantially as set forth.

13. The combination with a ribbon of a pair of spools, means for winding the ribbon upon either spool, a switch, and means whereby either spool may be actuated to operate the switch at the cessation of the unwinding movement of the other spool, substantially as set forth.

14. The combination with a ribbon of a pair of spools, a pair of ratchet-wheels, a pair of driving-pawls directly engaging said ratchet-wheels, means for reciprocating the pawls, a pair of vibratory supports, and a bar, as 48, connecting the supports and also adapted to move the pawls alternately out of engagement with the ratchet-wheels, substantially as set forth.

15. The combination with a ribbon of a pair of spools, a pair of driving-wheels, means for actuating the wheels, and a switch controlled by a double-acting spring and arranged to be operated at the cessation of the unwinding movement of either spool, substantially as set forth.

16. The combination with a ribbon, a pair of spools, and means for winding the ribbon from either spool to the other, of means for mechanically prolonging the longitudinal movement of the ribbon past the printing-point after it ceases to unwind from the delivery-spool, substantially as set forth.

17. The combination of a ribbon, a pair of spools, means for winding the ribbon from either spool to the other, means for prolonging the longitudinal movement of the ribbon past the printing-point after it ceases to unwind from the delivery-spool, and a switch arranged to be actuated during such prolongation of the movement of the ribbon, substantially as set forth.

18. The combination of a ribbon, a pair of spools, and means for mechanically actuating either spool both to wind the ribbon thereon and to prolong the longitudinal movement of the ribbon past the printing-point after it ceases to unwind from the other spool, substantially as set forth.

19. The combination of a ribbon, a pair of spools, a switch, and means for actuating either spool, first, to wind the ribbon thereon; second, to prolong the longitudinal movement of the ribbon past the printing-point after it ceases to unwind from the other spool, and, third, to operate the switch during such prolonged movement, substantially as set forth.

20. The combination with a ribbon and a spool of means for mechanically moving the spool laterally at the cessation of its unwinding movement and thereby prolonging the longitudinal movement of the ribbon past the printing-point, substantially as set forth.

21. The combination with a ribbon of a pair of spools and means for mechanically actuating either spool to wind the ribbon thereon and to also move the other spool laterally at the cessation of the unwinding movement thereof and thereby prolong the longitudinal movement of the ribbon past the printing-point, substantially as set forth.

22. The combination with a ribbon of a pair of spools, a switch, and means for actuating either spool, first, to wind the ribbon thereon; second, to move the other spool laterally at the cessation of the unwinding movement thereof and thereby prolong the longitudinal movement of the ribbon past the printing-point, and, third, to operate the switch during such prolonged movement of the ribbon, substantially as set forth.

23. The combination with a ribbon of a pair of spools, means for winding the ribbon upon either spool, a switching mechanism arranged to operate through the longitudinal movements of the ribbon when the body of the ribbon becomes wound upon either spool, to disengage the same from its winding means, and means for relieving the ribbon from longitudinal stress during such disengagement, substantially as set forth.

24. The combination with a ribbon of a pair of spools and means for mechanically winding the ribbon upon either spool and mechanically moving said spool laterally at the cessation of its winding movement, substantially as set forth.

25. The combination with a ribbon and a pair of spools connected for a simultaneous lateral movement, of means for mechanically winding the ribbon upon either spool and mechanically moving both spools laterally at the cessation of the winding movement, substantially as set forth.

26. In a type-writing machine, the combination with a pair of spools located at the sides of the machine, the spools being connected for a simultaneous lateral movement, and a ribbon arranged across the machine and extending down to the spools, of means for winding the ribbon upon either spool and forcing such spool downward and the other spool upward when the body of the ribbon becomes wound upon the said winding-spool, substantially as set forth.

27. The combination with a ribbon, a spool and a ratchet-wheel, of a pawl adapted to rotate the ratchet-wheel and spool and also to move the same laterally, substantially as set forth.

28. In a type-writing machine, the combination with spools provided with ratchet-wheels and located at the sides of the machine, the spools being connected for a simultaneous lateral movement, and a ribbon arranged across the machine and extending down to the spools, of a pair of pawls, each arranged to rotate its associate ratchet-wheel and spool to wind the ribbon thereon, and to also force such spool downward and the other spool upward at the cessation of the winding movement of the spool, substantially as set forth.

29. The combination with a ribbon, a pair of spools and a switch, of means for winding the ribbon upon either spool and moving such spool laterally to actuate the switch at the cessation of its winding movement, substantially as set forth.

30. The combination with a ribbon, a pair of spools provided with ratchet-wheels, and a switch, of a pair of pawls, each arranged to rotate its associated ratchet-wheel and spool to wind the ribon thereon and to also move such spool laterally to operate the switch when the body of the ribbon becomes wound thereon, substantially as set forth.

31. The combination with a ribbon, a pair of spools, a switch, and a double-acting spring, of means for winding the ribbon upon either spool; and means, called into action at the cessation of the unwinding movement of the other spool, for operating the double-acting spring to actuate the switch, substantially as set forth.

32. The combination with a ribbon of a pair of spools, pawl-and-ratchet mechanism for winding the ribbon upon either spool, a switch, and a switch-actuating spring called into operation through the tension of the ribbon when it is all unwound from the other spool, substantially as set forth.

33. The combination with a ribbon and a pair of spools of means for applying frictional opposition to the rotation of either spool only during the unwinding of the ribbon therefrom, substantially as set forth.

34. The combination with a ribbon, a pair of spools and a switching mechanism arranged to be operated through the longitudinal movements of the ribbon, of means for applying frictional opposition to the rotation of either spool during the unwinding of the ribbon therefrom, the construction and arrangement being such that the spool is relieved from such frictional application during the winding of the ribbon thereon, substantially as set forth.

35. The combination with a ribbon of a laterally-reciprocating spool and a stop arranged to both limit the lateral movement of the spool in one direction and frictionally oppose the unwinding of the ribbon therefrom, substantially as set forth.

36. The combination with a ribbon of a laterally-reciprocating spool, a friction-stop, and a spring for the spool arranged to augment the frictional opposition of the stop to the unwinding movement of the spool, substantially as set forth.

37. The combination with a ribbon of a laterally-movable spool provided with a boss or collar, and a friction-stop at said boss or collar, substantially as set forth.

38. The combination of a ribbon, a pair of spools, a switch, and means whereby the spools are alternately actuated, first, to wind the ribbon thereon; second, to move the ribbon widthwise, and, third, to operate the switch at the cessation of the unwinding movement of the other spool, substantially as set forth.

39. In a type-writing machine, the combination with a paper-carriage, a propelling-spring, a ribbon, a pair of spools, and a ribbon-switch, of a pawl-and-ratchet mechanism actuated by said spring and serving to move the ribbon lengthwise and widthwise and to operate the switch, substantially as set forth.

40. The combination of a spool, a shaft, a detent, a spring, and a plunger, substantially as set forth.

41. The combination of a shaft provided with a sliding sleeve, a spool arranged to fit over the sleeve, a detent, and a spring, substantially as set forth.

42. The combination with a shaft of a sleeve arranged to slide thereon and adapted to bear a ribbon-spool, the sleeve being prolonged beyond the end of the shaft, a spring arranged within the sleeve and adapted to bear in one direction against said end of the shaft and in the other direction against the sleeve, and a spool-detent controlled by the movements of the sleeve, substantially as set forth.

43. The combination of a detachable ribbon-spool provided with a series of circularly-disposed notches, and a spring-operated detent arranged to enter any of the notches, substantially as set forth.

44. The combination of a spool-support with a detachable and endwise-reversible ribbon-spool provided with a series of circularly-disposed notches, and a spring-detent for entering the notches and locking the spool upon its support, substantially as set forth.

45. The combination with a spool-support of a detachable and endwise-reversible ribbon-spool provided with a series of circularly-disposed notches at each end, and a spring-detent adapted to enter any of the notches and lock the spool in position, substantially as set forth.

46. The combination of a spool-support provided with a detent, and a detachable ribbon-spool composed of two flanges and a core, the core being provided with circularly-disposed openings to receive the detent, substantially as set forth.

47. The combination of a shaft, a detent pivoted thereon, and a detachable spool supported thereby and provided with a series of circularly-disposed notches for receiving the detent, substantially as set forth.

48. The combination of a shaft provided with an independently-movable sleeve, a spool arranged to fit over the sleeve and to be supported thereon, and a detent pivoted on the shaft and controlled by the sleeve, substantially as set forth.

49. The combination of a shaft, a spring-detent, a spool, and a plunger arranged at one end of the spool for operating the detent to release the spool, substantially as set forth.

50. In a type-writing machine, the combination of a shaft, a spring-detent, a spool, and a plunger arranged at the front of the spool for operating the detent to release the spool, substantially as set forth.

51. The combination of a ribbon-spool, a shaft, a detent mounted on the shaft, a sleeve arranged on the shaft and provided with an opening, and a projection on the detent arranged within said opening, substantially as set forth.

52. The combination with a ribbon-spool of a shaft, a detent projecting therefrom to lock the spool to the shaft, and a sleeve arranged to slide upon the shaft and force the detent to release the spool, substantially as set forth.

53. The combination with a ribbon-spool of a shaft provided with a detent for locking the spool and also with a plunger for forcing the detent to release the spool, substantially as set forth.

54. The combination with a pair of spools of a ribbon attached to each spool by a yielding connection adapted to yield when the spool is empty and the ribbon is drawn taut, means for winding the ribbon upon either spool, and a switching mechanism arranged to be called into operation by the cessation of the delivery of the ribbon from either spool, substantially as set forth.

55. The combination with a ribbon of a pair of spools, means for winding the ribbon upon either spool, a switching mechanism called into action at the cessation of the unwinding movement of either spool and arranged to engage such spool with its winding means prior to the disengagement of the other spool from its winding means, and means operating to release the ribbon from the winding action of the empty spool during such premature engagement with its winding means, substantially as set forth.

56. The combination with a spool having a series of openings of a spring arranged upon the spool and provided with a projection for entering any of the openings, and a ribbon attached to the spring and adapted to withdraw the projection to permit the spool to rotate independently of the spring and ribbon, substantially as set forth.

57. The combination of a ribbon, a laterally-reciprocating ribbon-spool provided with a winding-wheel, and a driving-wheel provided with a crank and arranged to engage said winding-wheel at one end of said reciprocal movement, whereby the spool may be rotated manually, substantially as set forth.

58. In a type-writing machine, the combination with a ribbon and a detachable spool of a top plate arranged over the spool and provided with a slot or opening for the passage of the ribbon, and a gate arranged at said opening, substantially as set forth.

59. The combination with a ribbon of a pair of endwise-inactive spools and a pair of pulleys over which the ribbon passes and to which it clings, the pulleys being adapted to reciprocate endwise independently of the spools and thereby constantly actuate the ribbon in widthwise direction, substantially as set forth.

60. The combination with a ribbon of a pair of endwise-inactive spools located at the sides of the machine, a pair of horizontal deflectors arranged above the spools, the ribbon being passed up from one spool and partly around the first deflector, thence across to the other deflector and partly around the same, and thence down to the other spool, and means for reciprocating the deflectors endwise independently of the spools at the passage of the ribbon from either spool to the other, to constantly actuate the portion of the ribbon between the deflectors in widthwise direction, independently of the remaining portion thereof, by reason of the clinging of the ribbon to the deflectors, substantially as set forth.

61. The combination with a ribbon of a pair of endwise-inactive spools located at the sides of the machine, a pair of horizontal pulleys arranged above the spools, the ribbon being passed up from one spool and partly around the same, so that it clings to the pulleys, and thence down to the other spool, and means for reciprocating the pulleys endwise independently of the spools, so as to constantly actuate the ribbon in widthwise direction, by reason of the clinging of the ribbon to the pulleys, substantially as set forth.

62. The combination with a ribbon of an endwise-reciprocating pulley, the construction and arrangement being such that the pulley is reciprocated endwise when set in motion by the passage of the ribbon thereover, substantially as set forth.

63. The combination with a ribbon of a rotating pulley, a cam arranged to coöperate therewith, and means for engaging the cam to cause the pulley to reciprocate endwise by reason of its rotation, substantially as set forth.

64. The combination with a ribbon of a pulley, a diagonally-arranged disk, and means for engaging the disk to cause the pulley to move endwise when rotated, substantially as set forth.

65. The combination of a pulley provided with a pair of diagonal disks and a pair of projections for engaging the disks to reciprocate the pulley endwise when rotated, substantially as set forth.

66. The combination of a pulley, a pair of diagonally-arranged disks, a bracket, and a pair of guiding-pins.

67. In a type-writing machine, the combination with the paper-carriage of a carriage-driving shaft arranged transversely in the base of the machine, and an arm arranged within the base for supporting the shaft at one end, the shaft being prolonged within the base beyond said arm and bearing upon its end an adjustable sleeve or cap for setting the carriage-alarm, substantially as set forth.

68. In a type-writing machine, the combination with the paper-carriage of a carriage-driving shaft arranged in the base of the machine, and being provided at its end with an adjustable sleeve or cap for setting the carriage-alarm, and such sleeve or cap being arranged to protrude through the wall of the base, substantially as set forth.

69. In a type-writing machine, the combination with a base and a top plate, of a carriage supported upon the top plate, a shaft arranged within the base and provided within the base with a sheave, spring, spring-adjusting means and adjustable sleeve for operating the carriage-alarm, and a cord attached to the sheave and extending up to the top plate and passing over a pulley thereat to a connection with the carriage, substantially as set forth.

70. In a type-writing machine, the combination with a paper-carriage, an inking-ribbon and a pair of spools, of a transversely-arranged shaft provided within the base with a sheave, spring, ribbon-spool-actuating means and adjustable sleeve for setting the carriage-alarm, and a cord attached to the sheave and connected to the paper-carriage, substantially as set forth.

71. The combination of a switching mechanism adapted to operate at the cessation of the unwinding movement of either spool without subjecting the ribbon to excessive wear at any point; spool-winding means; a ribbon, and a pair of spools secured thereto; the ribbon with its attached spools being detachably connected to both the switching mechanism and the winding means, substantially as set forth.

72. The combination of mechanism for mechanically reversing the longitudinal travel of the ribbon; spool-winding means; a ribbon, and a pair of transposable spools secured thereto; the ribbon with its attached spools being detachably connected to both the reversing mechanism and the winding means, so that the ribbon and spools may be bodily removed, turned end for end and replaced, without disconnecting the ribbon from either spool, whereby a different portion of the ribbon, considered widthwise, is subjected to the action of the types, substantially as set forth.

73. The combination of a switching mechanism actuable through the longitudinal movements of the ribbon; spool-winding means; a ribbon, and a pair of transposable spools secured thereto; the ribbon with its attached spools being detachably connected to both the switching mechanism and the winding means, so that the ribbon and spools may be bodily removed, turned end for end and replaced, without disconnecting the ribbon from either spool, whereby a different portion of the ribbon, considered widthwise, is subjected to the action of the types, substantially as set forth.

74. The combination of a switching mechanism arranged to operate at the cessation of the unwinding movement of either spool; spool-winding means; a ribbon, and a pair of transposable spools secured thereto; the ribbon with its attached spools being detachably connected to both the switching mechanism and the winding means, so that the ribbon and spools may be bodily removed, turned end for end and replaced, without disconnecting the ribbon from either spool, whereby a different portion of the ribbon, considered widthwise, is subjected to the action of the types, substantially as set forth.

75. The combination of mechanism for mechanically reversing the longitudinal travel of the ribbon; spool-winding means; a ribbon, and a pair of endwise-reversible spools secured thereto; the ribbon with its attached spools being detachably connected to both the reversing mechanism and the winding means, so that the ribbon and spools may be bodily removed, turned bodily over and replaced, in the described manner, without disconnecting the ribbon from either spool, whereby the other surface of the ribbon is presented to the types, substantially as set forth.

76. The combination of switching mechanism actuable through the longitudinal movements of the ribbon; spool-winding means; a ribbon, and a pair of endwise-reversible spools secured thereto; the ribbon with its attached spools being detachably connected to both the switching mechanism and the winding means, so that the ribbon and spools may be bodily removed, turned bodily over and replaced, in the described manner, without disconnecting the ribbon from either spool, whereby the other surface of the ribbon is presented to the types, substantially as set forth.

77. The combination of a switching mechanism arranged to operate at the cessation of the unwinding movement of either spool; spool-winding means; a ribbon, and a pair of endwise-reversible spools secured thereto; the ribbon with its attached spools being detachably connected to both the switching mechanism and the winding means, so that the ribbon and spools may be bodily removed, turned bodily over and replaced, in the described manner, without disconnecting the ribbon from either spool, whereby the other surface of the ribbon is presented to the types, substantially as set forth.

78. The combination of mechanism for mechanically reversing the longitudinal travel of the ribbon; spool-winding means; a ribbon, and a pair of transposable and endwise-reversible spools secured thereto; the ribbon with its attached spools being detachably connected to both the reversing mechanism and the winding means, so that the ribbon and spools may be bodily removed and either turned end for end or turned bodily over and replaced, without disconnecting the ribbon from either spool, substantially as set forth.

79. The combination of a switching mechanism actuable through the longitudinal movements of the ribbon; spool-winding means; a ribbon, and a pair of transposable and endwise-reversible spools secured thereto; the ribbon with its attached spools being detachably connected to both the switching mechanism and the winding means, so that the ribbon and spools may be bodily removed and either turned end for end or turned bodily over and replaced, without disconnecting the ribbon from either spool, substantially as set forth.

80. The combination of a switching mechanism arranged to operate at the cessation of the unwinding movement of either spool; spool-winding means; a ribbon, and a pair of transposable and endwise-reversible spools secured thereto; the ribbon with its attached spools being detachably connected to both the switching mechanism and the winding means, so that the ribbon and spools may be bodily removed and either turned end for end or turned bodily over and replaced, without disconnecting the ribbon from either spool, substantially as set forth.

81. The combination of means for mechanically imparting widthwise movement to the ribbon; spool-winding means; a ribbon, and a pair of spools secured thereto; the ribbon with its attached spools being detachably connected both to said means for imparting widthwise movement and to said winding means, so that the ribbon and spools may be bodily removed from the machine without disconnecting the ribbon from either spool, substantially as set forth.

82. The combination of means for mechanically imparting widthwise movement to the ribbon; spool-winding means; a ribbon, and a pair of transposable spools secured thereto; the ribbon with its attached spools being detachably connected both to said means for imparting widthwise movement and to said winding means, so that the ribbon and spools may be bodily removed, turned end for end and replaced without disconnecting the ribbon from either spool, substantially as set forth.

83. The combination of means for mechanically imparting widthwise movement to the ribbon; spool-winding means, a ribbon, and a pair of endwise-reversible spools secured thereto; the ribbon with its attached spools being detachably connected to said means for imparting widthwise movement and to said spool-winding means, so that the ribbon and spools may be bodily removed, turned bodily over and replaced without disconnecting the ribbon from either spool, substantially as set forth.

84. The combination of means for mechanically imparting widthwise movement to the ribbon; spool-winding means; a ribbon, and a pair of transposable and endwise-reversible spools secured thereto; the ribbon with its attached spools being detachably connected to said means for imparting widthwise movement and to said spool-winding means, so that the ribbon and spools may be bodily removed and turned end for end or turned bodily over and replaced without disconnecting the ribbon from either spool, substantially as set forth.

85. The combination of means for mechanically reversing the longitudinal travel of the ribbon; means for mechanically moving the ribbon widthwise; spool-winding means; a ribbon, and a pair of spools secured thereto; the ribbon with its attached spools being detachably connected to the reversing, widthwise-moving and winding means, whereby ribbon and spools may be bodily removed from the machine without disconnecting the ribbon from either spool, substantially as set forth.

86. The combination of means for mechanically reversing the longitudinal travel of the ribbon; means for mechanically moving the ribbon widthwise; spool-winding means; a ribbon, and a pair of transposable spools secured thereto; the ribbon with its attached spools being detachably connected to the reversing, widthwise-moving and winding means, whereby the ribbon and its attached spools may be removed, turned end for end and replaced without disconnecting the ribbon from either spool, substantially as set forth.

87. The combination of means for mechanically reversing the longitudinal travel of the ribbon; means for mechanically moving the ribbon widthwise; spool-winding means; a ribbon, and a pair of endwise-reversible spools secured thereto; the ribbon with its attached spools being detachably connected to the reversing, widthwise-moving and winding means, whereby the ribbon with its attached spools may be removed, turned bodily over and replaced without disconnecting the ribbon from either spool, substantially as set forth.

88. The combination of a switching mechanism adapted to be operated through the longitudinal movements of the ribbon; means for mechanically moving the ribbon widthwise; spool-winding means; a ribbon, and a pair of spools secured thereto; the ribbon with its attached spools being detachably connected to the switching mechanism and to the widthwise-moving and winding means, whereby ribbon and spools may be bodily removed from the machine without disconnecting the ribbon from either spool, substantially as set forth.

89. The combination of a switching mechanism arranged to operate at the cessation of the unwinding movement of either spool; means for mechanically moving the ribbon widthwise; a ribbon, and a pair of spools secured thereto; the ribbon with its attached spools being detachably connected to the switching mechanism and to the widthwise-moving and winding means, whereby ribbon and spools may be bodily removed from the machine without disconnecting the ribbon from either spool, substantially as set forth.

90. In a type-writing machine provided with a base, a top plate, and a paper-carriage supported above the top plate, the combination of a carriage-driving shaft provided with an adjustable spring and mounted transversely within the base, a sheave fixed on said shaft within the base and connected by a cord to the carriage, a detachable ribbon-spool at each side of the machine, a ratchet-wheel in rear of each spool, and means at each end of the said shaft for actuating the ratchet-wheels, substantially as set forth.

91. In a type-writing machine, the combination with a ribbon, a pair of spools, a pair of ratchet-wheels and a switch, of a transverse carriage-driving shaft provided at its ends with a pair of pawls for actuating the ratchet-wheels and the switch, substantially as set forth.

92. The combination with a ribbon-spool-winding means and a mechanically-operated switch of a ribbon-spool adapted to move laterally at the switching operation, substantially as set forth.

93. The combination with a ribbon-spool-winding means of a mechanically-operated switch and a ribbon-spool provided with a pivoted support, whereby it is swung laterally at the switching operation, substantially as set forth.

94. The combination with a ribbon of a pair of independently-mounted spools, means for winding the ribbon from either spool to the other, a mechanically-operated switch, and means for moving the spools laterally at the switching operation, substantially as set forth.

95. The combination with a ribbon of a shaft bearing a ribbon-spool and a ratchet-wheel, a mechanically-operated switch, and a hanger or support for the shaft adapted to vibrate at the switching operation, substantially as set forth.

96. The combination of a pair of deflectors, over which the ribbon passes and to which it clings; means for reciprocating the deflectors endwise, whereby the ribbon is constantly actuated in widthwise direction; a ribbon, and a pair of endwise-inactive spools secured thereto; the ribbon with its attached spools being detachably connected to the deflectors and the winding means, so that the ribbon and spools may be bodily removed from the machine, without disconnecting the ribbon from either spool, substantially as set forth.

97. The combination of a spool-shaft supported at one end; a spool arranged to be slipped onto the free end of the shaft; a detent to hold the spool on the shaft; and a device arranged on the free end of the shaft outside of the spool and adapted to be moved in the direction of the spool-axis to release the spool from the shaft, substantially as set forth.

98. In a type-writing machine, the combination of a carriage-propelling spring of ribbon-spool-winding means adapted to be actuated thereby; means for mechanically reversing the longitudinal movement of the ribbon also adapted to be operated by said spring; a ribbon, and a pair of spools secured thereto, the ribbon with its attached spools being detachably connected to said spring-operated spool winding and reversing means, whereby ribbon and spools may be bodily withdrawn from the machine without disconnecting the ribbon from either spool, substantially as set forth.

99. In a type-writing machine, the combination of a carriage-propelling spring of ribbon-spool-winding means adapted to be actuated thereby; means for mechanically reversing the longitudinal movement of the ribbon also adapted to be operated by said spring; means also adapted to be operated by said spring for imparting widthwise movement to the ribbon; a ribbon, and a pair of spools secured thereto, the ribbon with its attached spools being detachably connected to said spring-operated spool winding, reversing, and widthwise-moving means, whereby ribbon and spools may be bodily withdrawn from the machine without disconnecting the ribbon from either spool, substantially as set forth.

100. The combination with a ribbon and winding means therefor of a self-reciprocating pulley partly around which the ribbon passes and by which the ribbon is moved widthwise, substantially as set forth.

101. In a type-writing machine the combination of a pair of spools, one arranged at each side of the type system, the spools being disposed edge to edge, so that they rotate in transverse planes, and the ribbon extending from one spool once across the type system to the opposite spool, and a switch adapted to operate mechanically at the cessation of the unwinding movement of either spool, substantially as set forth.

102. The combination with a ribbon of a pair of spools, a laterally-movable ratchet-wheel connected to each spool, and a spring-actuated driving-pawl for each ratchet-wheel, each pawl being provided with a series of teeth for engaging its associated ratchet-wheel both to rotate it and to move it in lateral direction, substantially as set forth.

103. In a type-writing machine provided with a system of types and a paper-carriage adapted to travel over the types, the combination of a pair of vertically-swinging supports, one at each side of the type system and below the path of the paper-carriage; stops for limiting the movement of the vertically-swinging supports; a pair of ribbon-spools, one upon each support; a pair of winding-wheels, one at each ribbon-spool; a pair of actuating devices, one at each winding-wheel; and means actuable through the movements of the vertically-swinging supports for engaging either winding-wheel with its associated actuating device, and simultaneously disengaging the other winding-wheel from its associated actuating device, substantially as set forth.

104. In a type-writing machine having a circular series of type-bars mounted in a top plate, and both a paper-carriage and a ribbon arranged to travel transversely over the type-bars, the combination with the spool-winding mechanism of, first, a pair of detachable ribbon-spools, one at each side of the type-bar system, the ribbon being passed up from one spool, across and over the type-bars and down to the other spool, and the construction being such that the spools may be slipped off and together with the ribbon lifted bodily from the machine, without disconnecting the ribbon from either spool, and, second, a switch connected to the spool-winding mechanism and adapted to operate mechanically at the cessation of the unwinding movement of either spool, substantially as set forth.

105. In a type-writing machine having a circular series of type-bars mounted in a top plate, and both a paper-carriage and a ribbon arranged to travel transversely over the type-bars, the combination with the spool-winding mechanism of, first, a pair of detachable ribbon-spools, one at each side of the type-bar system, the ribbon being passed up from one spool, across and over the type-bars and down to the other spool, and the construction being such that the spools may be slipped off and together with the ribbon lifted bodily from the machine, without disconnecting the ribbon from either spool, and, second, a pair of endwise-reciprocating deflectors, one on each side of the type-bar system, around which the ribbon passes and to which it consequently clings, whereby movement is constantly imparted to the ribbon in widthwise direction, substantially as set forth.

106. The combination with a ribbon of a pair of spools, each provided with a rotary driver, such as a ratchet-wheel, and an actuator therefor, such as a pawl; and a switching mechanism called into operation by either actuator when the ribbon becomes taut by reason of the cessation of the unwinding movement of the delivery-spool, and adapted to effect the disengagement of said actuator from its associated rotary driver and to also effect the reëngagement of the other actuator with its associated rotary driver; the construction and arrangement being such that at such cessation of the unwinding movement of the delivery-spool the switching mechanism is positively actuated independently of the rotary driver and actuator associated with the empty spool, and such that the rewinding of the ribbon upon the empty spool begins simultaneously with the cessation of the longitudinal movement of the ribbon past the printing-point in either direction, substantially as set forth.

107. In a type-writing machine, the combination with a ribbon of a pair of spools, one located at each side of the machine, and each provided with a rotary driver, such as a ratchet-wheel, and an actuator therefor, such as a pawl; and a switching mechanism called into operation by either actuator when the ribbon becomes taut by reason of the cessation of the unwinding movement of the delivery-spool, and adapted to effect the disengagement of said actuator from its associated rotary driver and to also effect the reëngagement of the other actuator with its associated rotary driver; the construction and arrangement being such that at such cessation of the unwinding movement of the delivery-spool the switching mechanism is positively actuated independently of the rotary driver and actuator associated with the empty spool, and such that the rewinding of the ribbon upon the empty spool begins simultaneously with the cessation of the longitudinal movement of the ribbon past the printing-point in either direction, substantially as set forth.

108. In a type-writing machine, the combination with a ribbon of a pair of spools, one located at each side of the machine, and each provided with a rotary driver, such as a ratchet-wheel, and an actuator therefor, such as a pawl; a spring arranged both to propel the paper-carriage and to also operate the said actuators; and a switching mechanism called into operation by either actuator when the ribbon becomes taut by reason of the cessation of the unwinding movement of the delivery-spool, and adapted to effect the disengagement of said actuator from its associated rotary driver and to also effect the reëngagement of the other actuator with its associated rotary driver; the construction and arrangement being such that at such cessation of the unwinding movement of the delivery-spool the switching mechanism is positively actuated independently of the rotary driver and actuator associated with the empty spool, and such that the rewinding of the ribbon upon the empty spool begins simultaneously with the cessation of the longitudinal movement of the ribbon past the printing-point in either direction, substantially as set forth.

109. The combination with a ribbon of a receiving-spool; a ratchet-wheel operatively connected thereto; a delivery-spool; a pawl adapted to engage the ratchet-wheel to wind the ribbon upon the receiving-spool; and a switching mechanism adapted to be operated by the pawl through further movements of the spool and ribbon when the ribbon becomes taut by reason of the cessation of the unwinding movement of the delivery-spool, and thereby effect a disconnection between the pawl and the receiving-spool, substantially as set forth.

110. The combination with a ribbon of a pair of spools, each provided with a ratchet-wheel and an actuating-pawl; and a switching mechanism adapted to be operated by either pawl through further movements of its associated spool and the ribbon when the ribbon becomes taut at the cessation of the unwinding movement of the other spool, and to thereby effect both a disengagement between such pawl and its associated ratchet-wheel, and a reëngagement of the other pawl to its associated ratchet-wheel, substantially as set forth.

111. The combination of a ribbon; a pair of spools; means for winding the ribbon alternately upon the spools; a switching mechanism connected to the winding means and adapted to be operated by the ribbon through the terminal longitudinal movement thereof in either direction; and means for applying frictional opposition to the longitudinal movements of the ribbon only during the interval between switching operations, substantially as set forth.

112. In an automatic ribbon winding and switching mechanism in which the actuation of the switching mechanism necessitates a longitudinal strain upon the ribbon, in consequence of which there is liability of the coils of ribbon drawing more tightly upon the winding-spool, thus delaying the consummation of the switching operation: the combination with the spools, the winding means and the switching mechanism of means for applying frictional opposition to the spools alternately during the unwinding of the ribbon therefrom, whereby the coils of ribbon are drawn tightly upon the winding-spool during the winding of the ribbon thereon and prior to the actuation of the switching mechanism, substantially as set forth.

113. In a type-writing machine, the combination of a ribbon-spool, a horizontally-arranged shaft, and a movable support or bracket, the shaft being rotatably supported at its rear end in the bracket, and the spool being detachably mounted upon the forward end of the shaft; means for winding the spool; and means connected to the movable support or bracket and adapted to be actuated thereby for automatically rendering the winding means inoperative, substantially as set forth.

114. In a type-writing machine, the combination with a ribbon of a spool, a ratchet-wheel provided with an actuating-pawl, a shaft, and a pivoted support or bracket for the shaft, the shaft bearing the ratchet-wheel at one end and the spool at the other end, and being supported by the bracket between the ratchet-wheel and spool; and means connected to the pivoted support or bracket and adapted to be actuated thereby for effecting a disconnection between the ratchet-wheel and the actuating-pawl, substantially as set forth.

Signed at Elizabeth, in the county of Union and State of New Jersey, this 29th day of July, 1896.

BURNHAM COOS STICKNEY.

Witnesses:
CARL GABRIELSON,
KNUT SCHOLM.